(12) United States Patent
Fok et al.

(10) Patent No.: US 8,620,314 B2
(45) Date of Patent: Dec. 31, 2013

(54) APPARATUS AND METHODS FOR DETERMINING CONNECTION QUALITY OF A WIRELESS DEVICE ON A WIRELESS COMMUNICATIONS NETWORK

(75) Inventors: Kenny Fok, San Diego, CA (US); Eric Chi Chung Yip, San Diego, CA (US); Jihyun Hwang, San Diego, CA (US); Lenaig Genevieve Guellec, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 783 days.

(21) Appl. No.: 11/078,235

(22) Filed: Mar. 10, 2005

(65) Prior Publication Data

US 2006/0203738 A1 Sep. 14, 2006

(51) Int. Cl.
*H04W 4/00* (2009.01)

(52) U.S. Cl.
USPC .................. 455/435.1; 455/452.2; 455/456.1; 455/456.2; 455/456.3; 455/456.4; 455/456.5; 455/456.6

(58) Field of Classification Search
USPC ............... 455/435.1, 456.1–456.6, 452.2
See application file for complete search history.

(56) References Cited

U.S. PATENT DOCUMENTS

| | | | |
|---|---|---|---|
| 6,137,800 A | 10/2000 | Wiley et al. | |
| 6,366,780 B1 * | 4/2002 | Obhan | 455/453 |
| 6,381,459 B1 | 4/2002 | Gervens et al. | |
| 6,427,075 B1 | 7/2002 | Burg et al. | |
| 6,587,447 B1 | 7/2003 | Wang et al. | |
| 6,633,760 B1 | 10/2003 | Ham et al. | |
| 6,654,362 B1 | 11/2003 | Palamara | |
| 6,671,367 B1 | 12/2003 | Graf et al. | |
| 6,690,929 B1 | 2/2004 | Yeh | |
| 6,721,554 B2 | 4/2004 | Gnesda et al. | |
| 2004/0203855 A1 * | 10/2004 | Veerasamy et al. | 455/456.1 |
| 2006/0089137 A1 * | 4/2006 | Howell et al. | 455/423 |
| 2006/0126536 A1 * | 6/2006 | Patel et al. | 370/254 |

FOREIGN PATENT DOCUMENTS

| | | |
|---|---|---|
| EP | 0 730 388 A2 | 9/1996 |
| EP | 1 263 249 A1 | 12/2002 |
| EP | 1 309 214 A1 | 5/2003 |
| JP | 2004080206 | 3/2004 |

(Continued)

OTHER PUBLICATIONS

International Search Report and Written Opinion—PCT/US2006/008320, International Search Authority—European Patent Office—Jul. 9, 2006.

(Continued)

*Primary Examiner* — Lester Kincaid
*Assistant Examiner* — Mehmood B Khan
(74) *Attorney, Agent, or Firm* — Charles E. Eggers

(57) ABSTRACT

Apparatus and methods for determining a connection quality of a wireless device with a wireless communications network comprise a user manager operable to receive a plurality of communications messages as recorded by the wireless device, where the plurality of communications messages comprise messages transmitted from and received by the wireless device via the wireless communication network. Further, a connection quality module associated with the user manager is operable to generate a connection quality record comprising a connection quality characteristic based on a detection of a predetermined sequence of communications messages within the plurality of communications messages. Optionally, an optimization module may generate a configuration change for the wireless device and/or a network component based on the connection quality characteristic.

64 Claims, 22 Drawing Sheets

(56) References Cited

FOREIGN PATENT DOCUMENTS

| | | |
|---|---|---|
| JP | 2004166140 | 6/2004 |
| KR | 1020010018998 | 3/2001 |
| WO | WO 00/67507 | 11/2000 |
| WO | WO2005018153 | 2/2005 |

OTHER PUBLICATIONS

Taiwan Search Report—TW095108048—TIPO—Mar. 23, 2012.

* cited by examiner

| Mobile Stations | Transactions | Profiles | RAPTOR Report | Mobiles & Users | Advanced |
|---|---|---|---|---|---|

85 ⭠

87 ⭨

RAPTOR Report History

Viewing History for <u>UK GPS Example</u>

Summary Report View

Monthly (08/30/2004 13:32:00 to 09/30/2004 13:32:00) ⭠ 89

| Manf. & Firmware | No. of mobiles | MDM set (zip) | Total no. of calls | Call drop rate | Total no. of access attempts | Access failure rate |
|---|---|---|---|---|---|---|
| UMTS_OEM V82005 | 1 | <u>Click here</u> | 16 | 50% (8/16) | 24 | 33.33% (8/24) |
| Summary | 1 | <u>Click here</u> | 16 | 50% (8/16) | 24 | 33.33% (8/24) |

<u>Download RAPTOR report summary (txt)</u>

FIG. 4

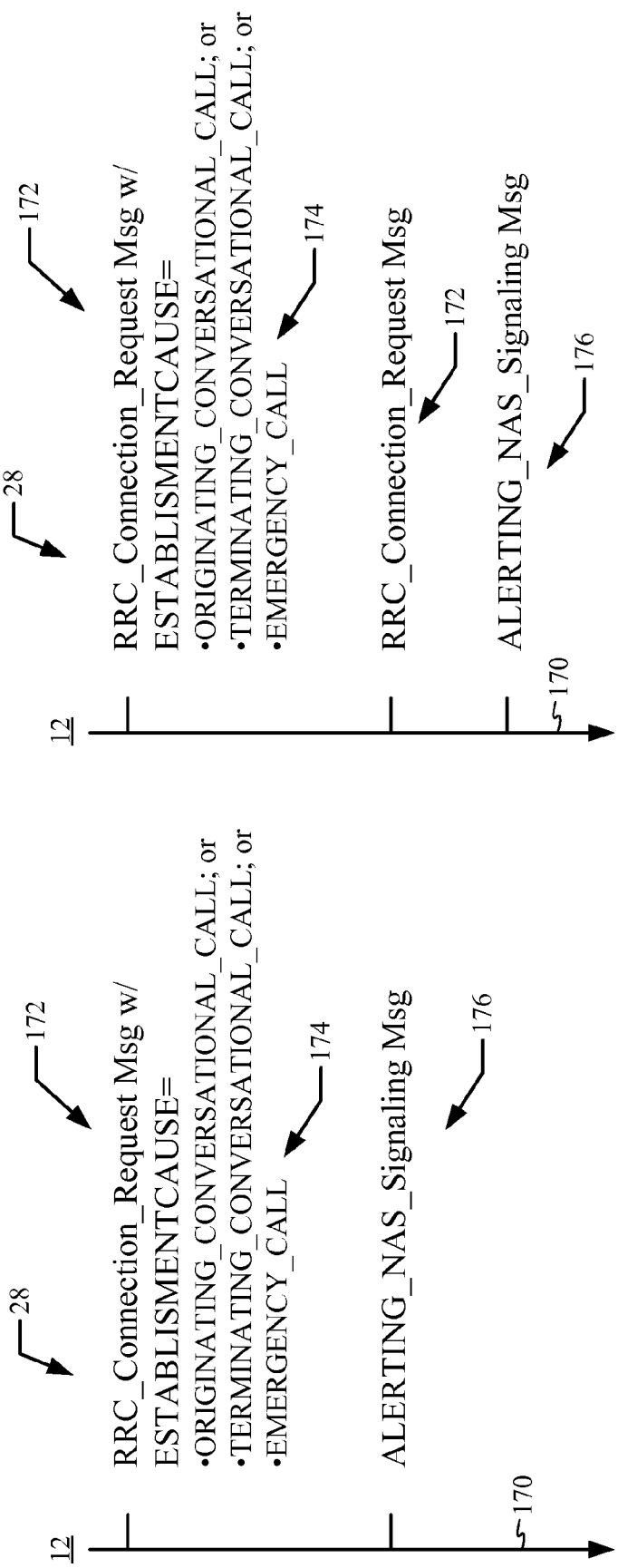

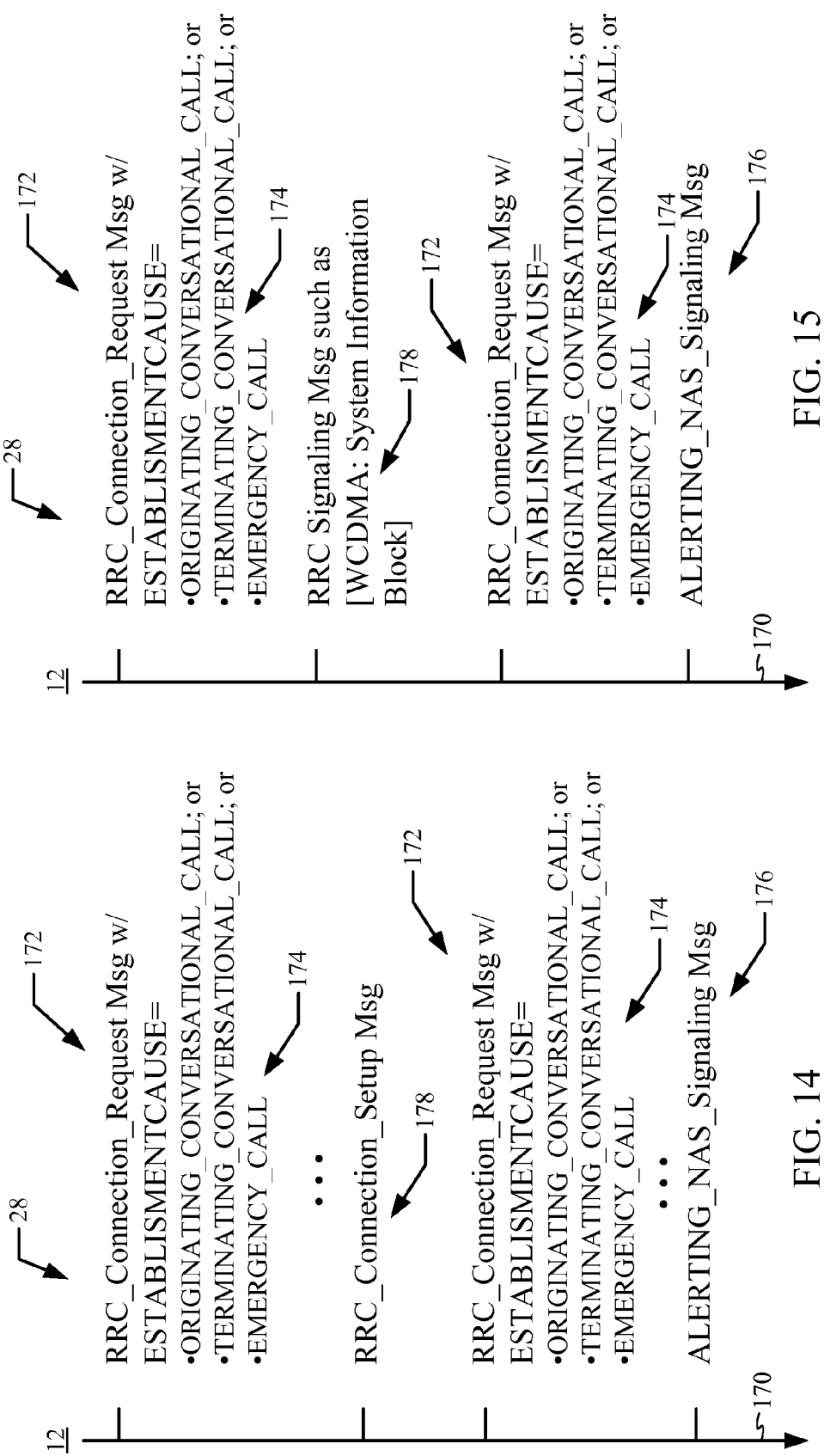

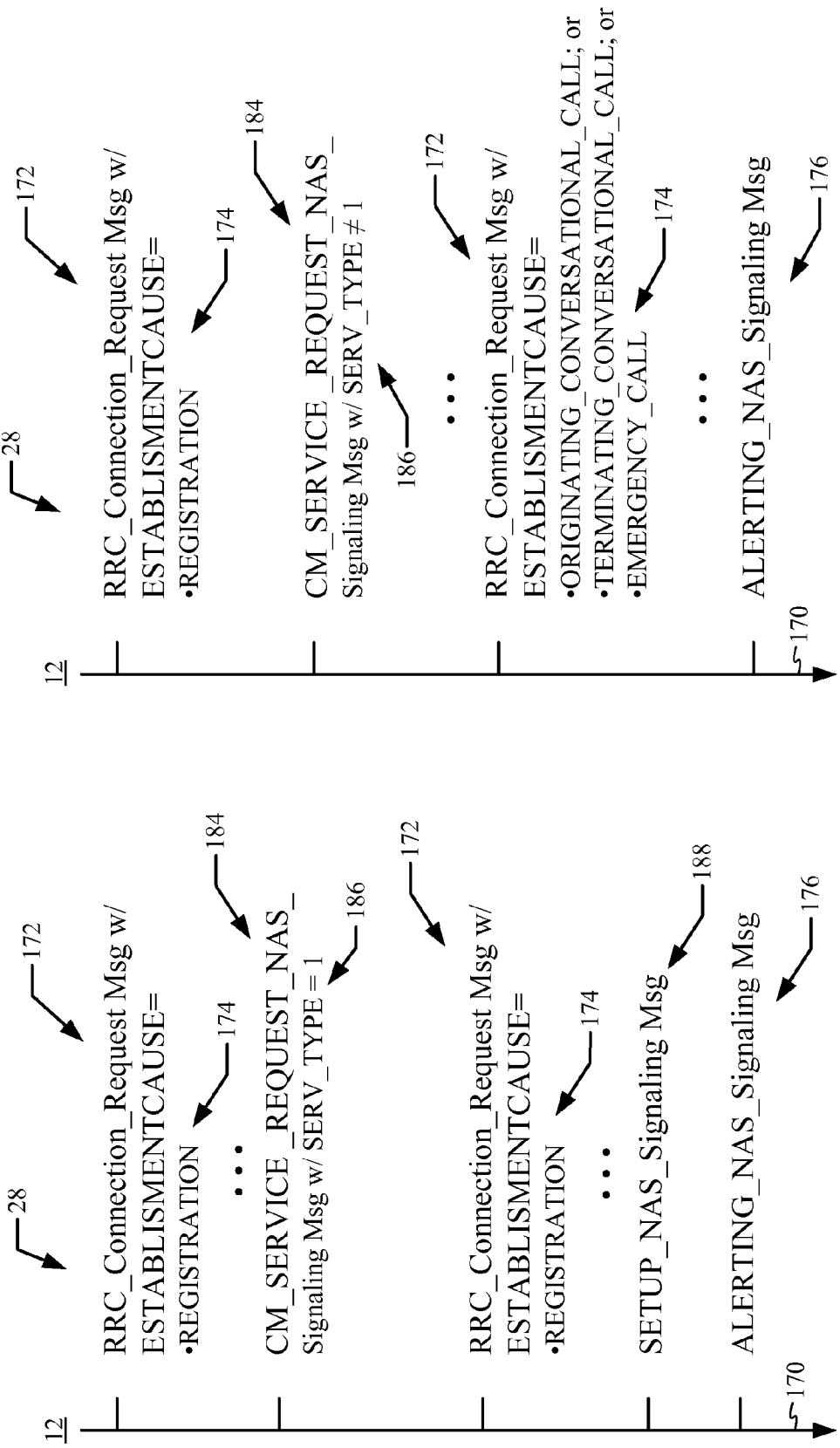

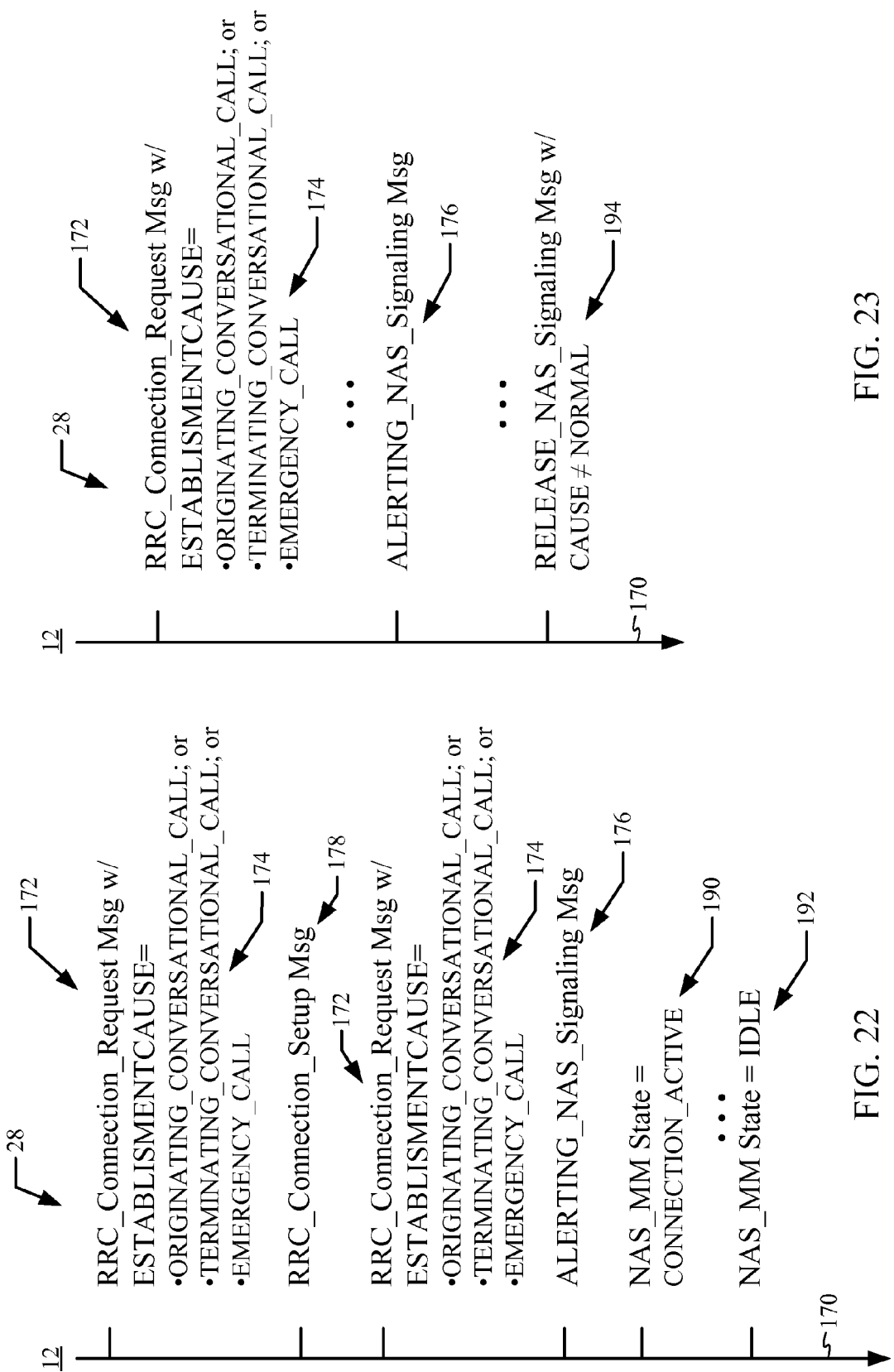

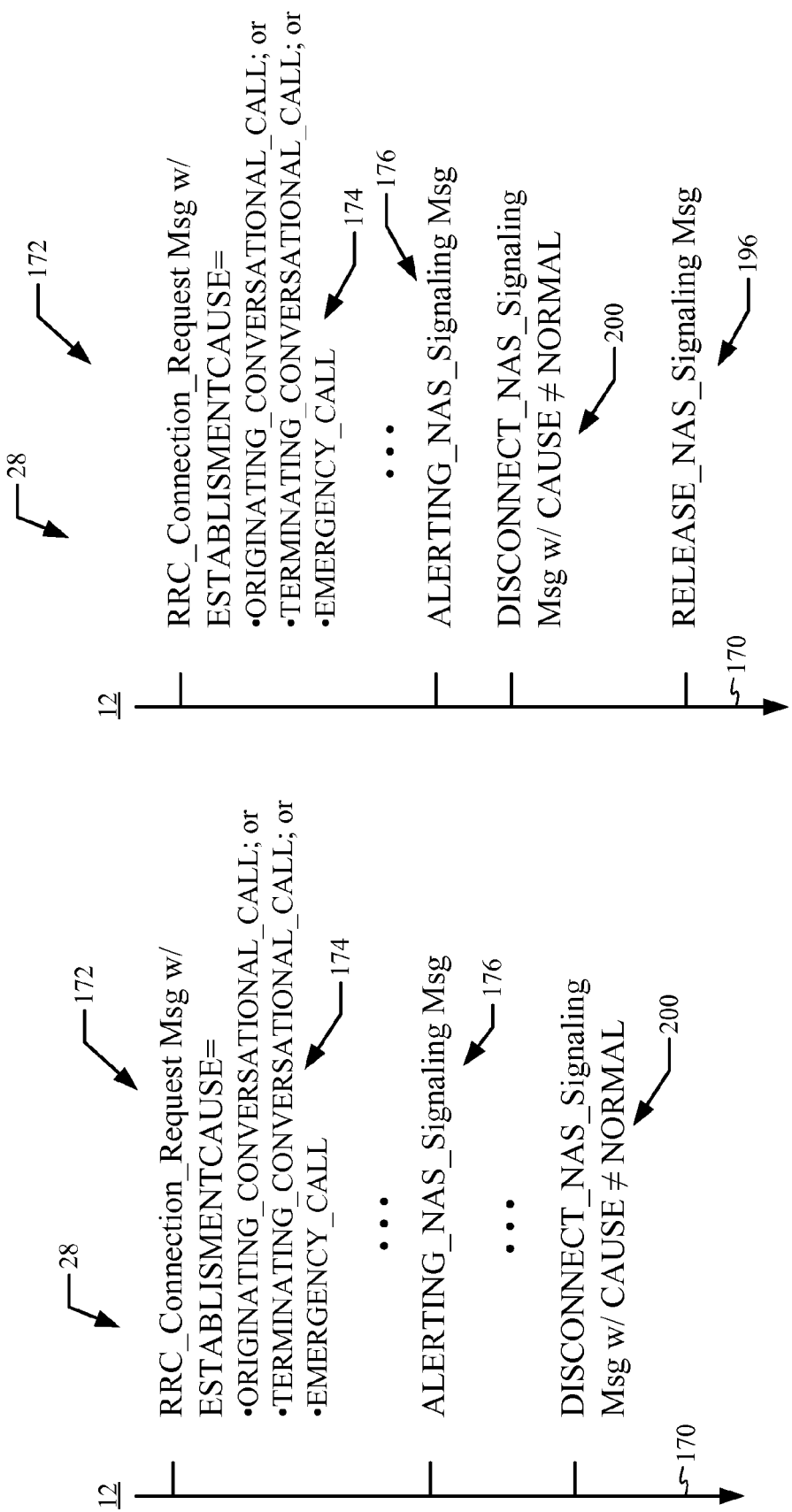

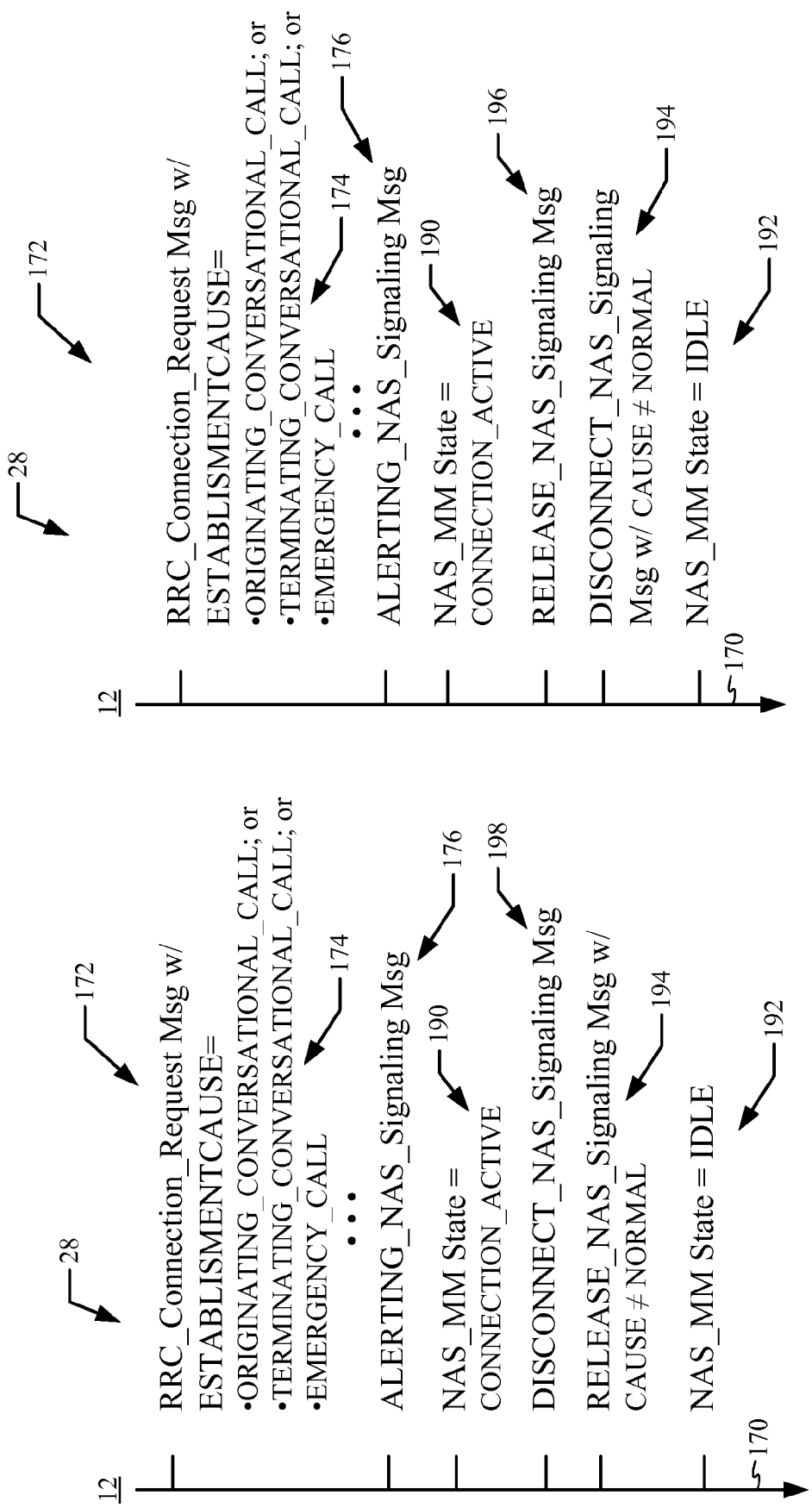

APPARATUS AND METHODS FOR DETERMINING CONNECTION QUALITY OF A WIRELESS DEVICE ON A WIRELESS COMMUNICATIONS NETWORK

BACKGROUND

The disclosed embodiments relate to wireless devices and wireless communication networks, and more particularly, to apparatus and methods for determining a connection quality of a wireless device on a wireless network.

Wireless communications devices, such as mobile phones, pagers, handheld computers, etc., are becoming increasingly popular for both business and personal use. One advantage of such devices is their "wireless" aspect, allowing them to be utilized whenever and wherever a user desires. As the use of wireless devices grow, and as the associated wireless communications networks grow, users have an ever-increasing expectation of being able to connect with a wireless network at any location. Thus, one aspect of user satisfaction when utilizing a wireless device deals with the ability of the wireless device to establish a communications connection with a wireless network, as well as the ability of the wireless device to maintain that connection.

Some communications protocols have developed standard mechanisms that define an event associated with a connection characteristic, such as an access failure and a call drop. For example, in the Code Division Multiple Access ("CDMA") protocol, such mechanisms include timers that are associated with an event that defines a failure, e.g. from the Interim Standard ("IS")-95 standard, time limit $T_{5m}$ is associated with a call drop. Other protocols, such as the Universal Mobile Telephone System ("UMTS") protocol, do not have such standard mechanisms that correspond to a connection quality characteristic. Without such standard mechanisms, it is difficult to measure and manage connection quality between a wireless device and a wireless network.

BRIEF SUMMARY

To address one or more of the drawbacks of the prior art, the disclosed embodiments provide a system and method is disclosed for determining a connection quality of a wireless device on a wireless network based on standard over-the-air communications messages.

In one embodiment, a method of determining a connection quality between a wireless device and a wireless communications network comprises receiving a plurality of communications messages as recorded by the wireless device, where the plurality of communications messages comprise messages transmitted from and received by the wireless device via the wireless communication network. The method further comprises generating a connection quality record comprising a connection quality characteristic based on a detection of a predetermined sequence of communications messages within the plurality of communications messages. In an alternate embodiment, a computer-readable medium for determining a connection quality between a wireless device and a wireless communications network comprises at least one sequence of instructions, wherein execution of the instructions by a processor causes the processor to perform the steps as described above.

In another embodiment, a method of determining a connection quality between a wireless device and a wireless communications network comprises receiving a plurality of communications messages transmitted from and received by the wireless device on the wireless communications network and identifying a connection quality characteristic within the plurality of communications messages based on a detection of a predetermined sequence of messages. The method further comprises generating a connection quality record associated with the received plurality of messages, the connection quality record comprising the connection quality characteristic, generating a configuration change for at least one of the wireless device and a network component in the wireless communication network based on the connection quality record. In an alternate embodiment, a computer-readable medium for determining a connection quality between a wireless device and a wireless communications network comprises at least one sequence of instructions, wherein execution of the instructions by a processor causes the processor to perform the steps as described above.

In a further embodiment, a wireless device connection quality determination apparatus comprises a user manager operable to receive a plurality of communications messages as recorded by the wireless device, where the plurality of communications messages comprise transmitted messages sent from the wireless device over a wireless communications network. The apparatus further comprises a connection quality module operable to generate a connection quality record comprising a connection quality characteristic based on a detection of a predetermined sequence of communications messages within the plurality of communications messages.

In a further embodiment, an apparatus for determining a connection quality between a wireless device and a wireless communications network comprises a first means for receiving a plurality of communications messages transmitted from and received by the wireless device on the wireless communications network, and a second means for identifying a connection quality characteristic within the plurality of communications messages based on a detection of a predetermined sequence of messages. The apparatus further comprises a third means for generating a connection quality record associated with the received plurality of messages, the connection quality record comprising the connection quality characteristic. Additionally, the apparatus comprises a fourth means for generating a configuration change for at least one of the wireless device and a network component in the wireless communication network based on the connection quality record.

In another embodiment, a wireless communications device comprises a processor operable to transmit and receive a plurality of communications messages respectively to and from a wireless network and a memory having a resident connection quality module. The resident connection quality module comprises executable instructions operable to collect and forward the communications messages across the wireless network, wherein a predetermined sequence of the plurality of communications messages corresponds to a connection quality characteristic of the wireless device on the wireless network.

In yet another embodiment, a wireless communications device comprises logic configured to process a plurality of communications messages for transmission from the wireless communications device to a wireless communications network and for receipt by the wireless communications device from the wireless communications network. The device further comprises logic configured to gather the plurality of communications messages in the form of a communications log and transmit, at a predetermined time, the communications log across the wireless communications network. Further, a predetermined sequence of the plurality of communications messages corresponds to a connection quality characteristic of the wireless device on the wireless network.

In still another embodiment, a wireless communications device comprises a first means for processing a plurality of communications messages for transmission from the wireless communications device to a wireless communications network and for receipt by the wireless communications device from the wireless communications network. The device further comprises a second means for gathering the plurality of communications messages in the form of a communications log and transmitting, at a predetermined time, the communications log across the wireless communications network, where a predetermined sequence of the plurality of communications messages corresponds to a connection quality characteristic of the wireless device on the wireless network.

In another embodiment, a method for determining a connection quality characteristic of a wireless communications device comprises processing a plurality of communications messages for transmission from the wireless communications device to a wireless communications network and for receipt by the wireless communications device from the wireless communications network. The method further comprises gathering the plurality of communications messages in the form of a communications log, and transmitting, at a predetermined time, the communications log across the wireless communications network, where a predetermined sequence of the plurality of communications messages corresponds to a connection quality characteristic of the wireless device on the wireless network. In an alternate embodiment, a computer-readable medium for determining a connection quality between a wireless device and a wireless communications network comprises at least one sequence of instructions, wherein execution of the instructions by a processor causes the processor to perform the steps as described above.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which:

FIG. 4 is a representation of one embodiment of an output generated by a user manager that summarizes an analysis of at least one connection quality characteristic associated with a plurality of communications messages, including a summary table and interactive drop-down menus that provide access to further detailed data;

FIG. 12 is an example of a sequence of communications messages associated with an access attempt;

FIG. 13 is another example of a sequence of communications messages associated with an access attempt, including a duplicate connection request message;

FIG. 14 is an example of a sequence of communications messages associated with two access attempts, including one access failure;

FIG. 15 is another example of a sequence of communications messages associated with two access attempts, including one access failure;

FIG. 18 is a further example of a sequence of communications messages associated with two access attempts, including one access failure;

FIG. 19 is a further example of a sequence of communications messages associated with an access attempt;

FIG. 22 is a further example of a sequence of communications messages associated with an access success and a call drop, due to a state change;

FIG. 23 is yet another example of a sequence of communications messages associated with an access success and a call drop, due to an abnormal release message;

FIG. 28 example of a sequence of communications messages associated with an access success and a call drop, due to an abnormal disconnect message;

FIG. 29 is still another example of a sequence of communications messages associated with an access success and a call drop, due to an abnormal disconnect message;

FIG. 30 is a further example of a sequence of communications messages associated with an access success without a call drop, due to the normal disconnect message;

FIG. 31 is still another example of a sequence of communications messages associated with an access success without a call drop, due to a normal disconnect message.

DETAILED DESCRIPTION

The disclosed embodiments include apparatus and methods for determining connection characteristics, such as access failures and call drops, associated with communications messages as logged by a wireless device during communications activities with a wireless network. These apparatus and methods identify predetermined sequences of communications messages, such as standard over-the-air messages, and associate them with, for example, an access failure event and/or a call drop event to allow connection quality to be measured, analyzed and/or improved. The described apparatus and methods are particularly suited for communications protocols without standardized connection-quality-related event mechanisms, such as, but not limited to, the Universal Mobile Telephone System ("UMTS") protocol.

Figure 1:
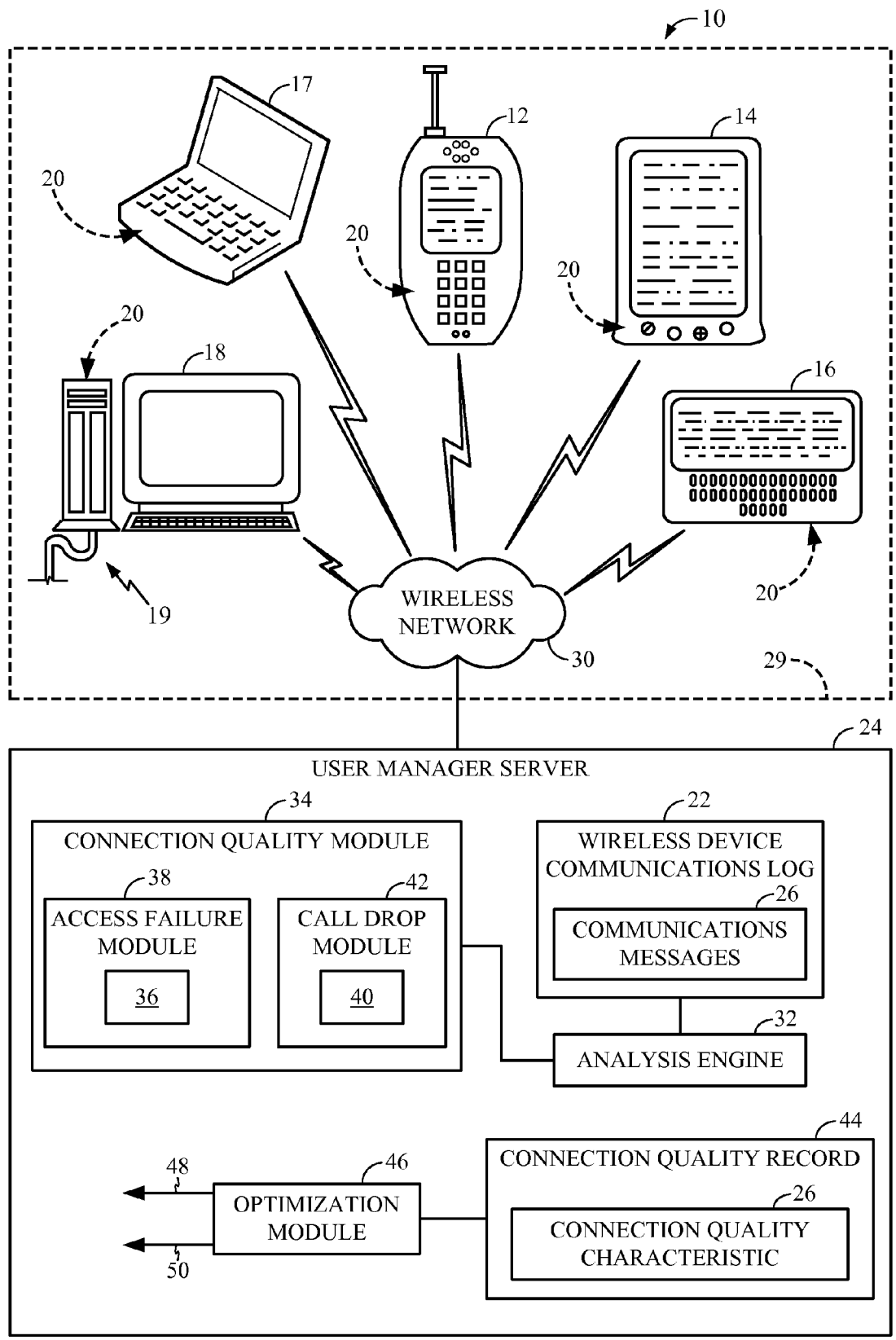
FIG. 1 is a representative diagram of one embodiment of a connection quality system associated with a wireless device and a wireless communication network.
Figure 2:
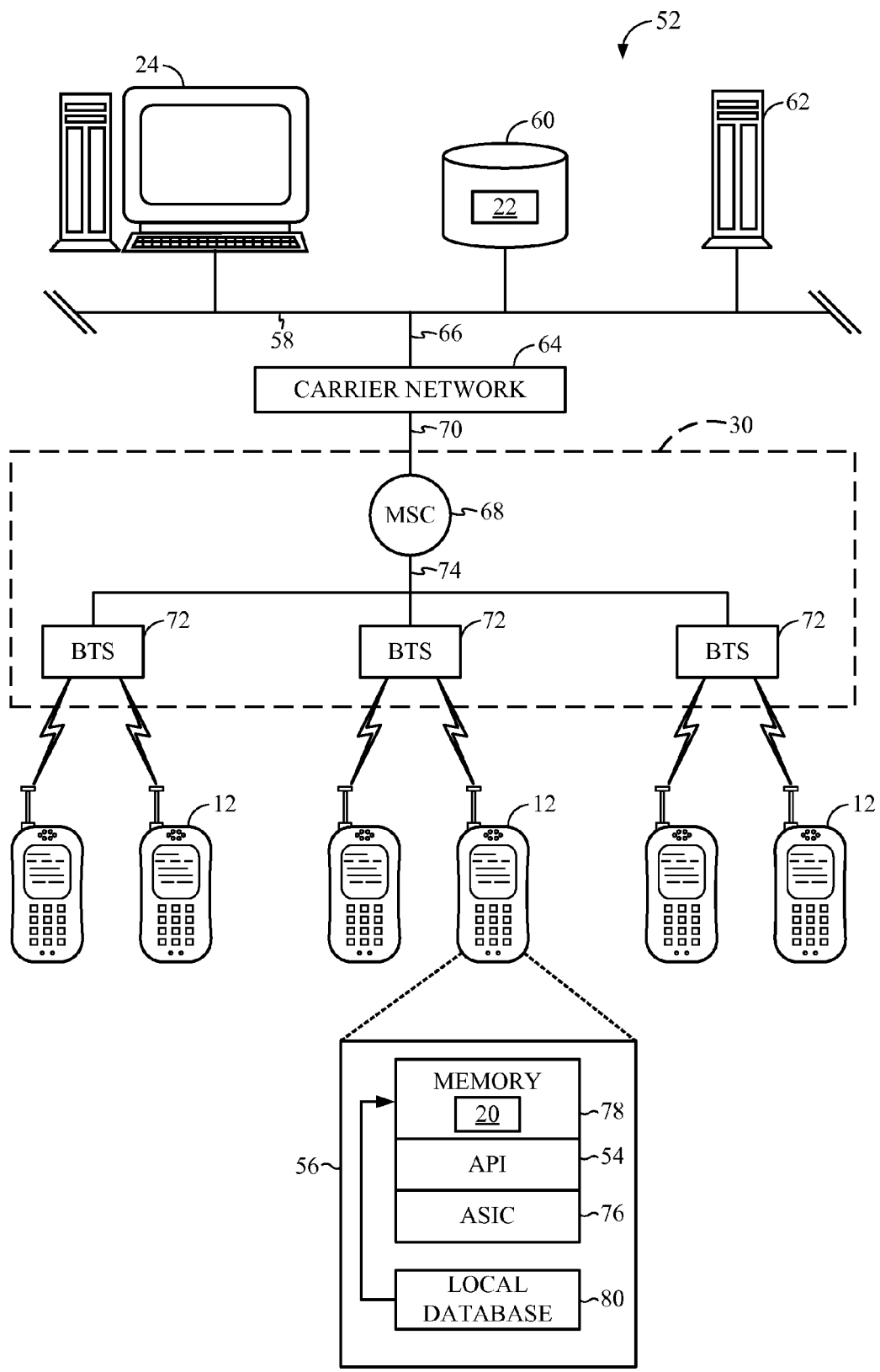
FIG. 2 is a schematic diagram of one embodiment of a cellular telephone network embodiment of the system of FIG. 1, including one embodiment of a computer platform of the computer device of FIG. 1.
Figure 3:
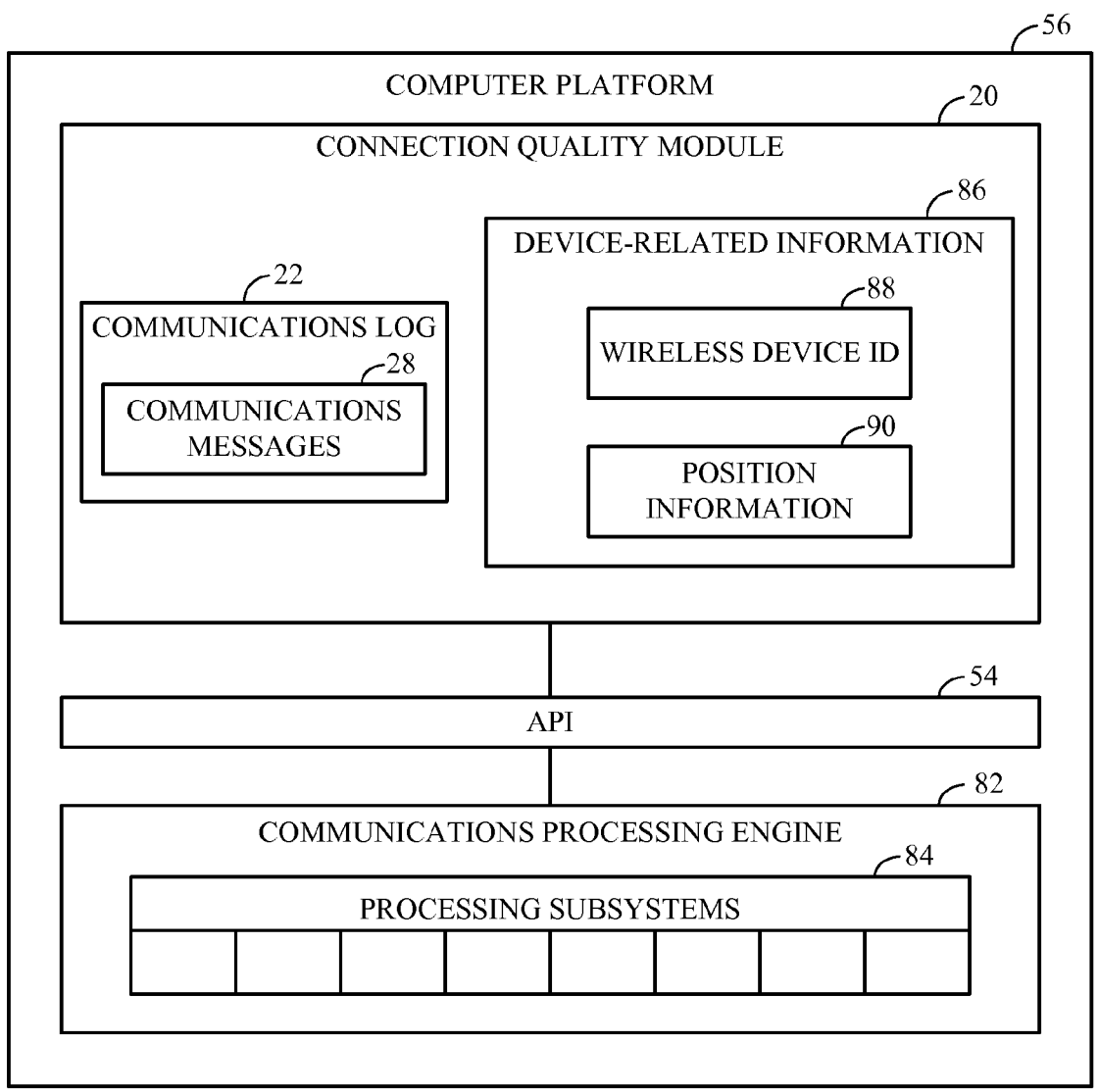
FIG. 3 is one embodiment of an architecture diagram of the computer platform of FIG. 2.
Figure 5:
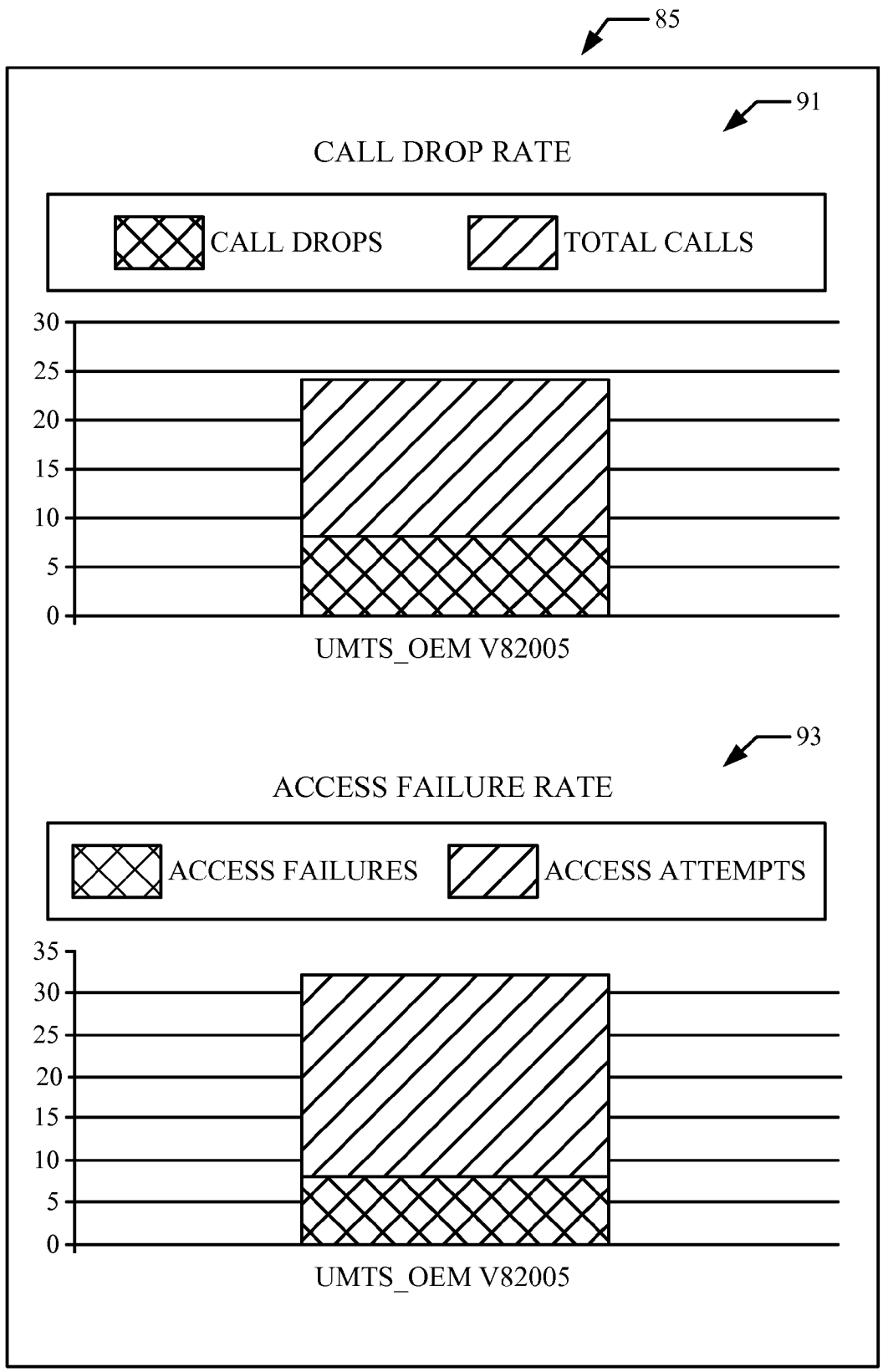
FIG. 5 is a representation of one embodiment of an output generated by a user manager, similar to FIG. 4, including bar charts.
Figure 6:
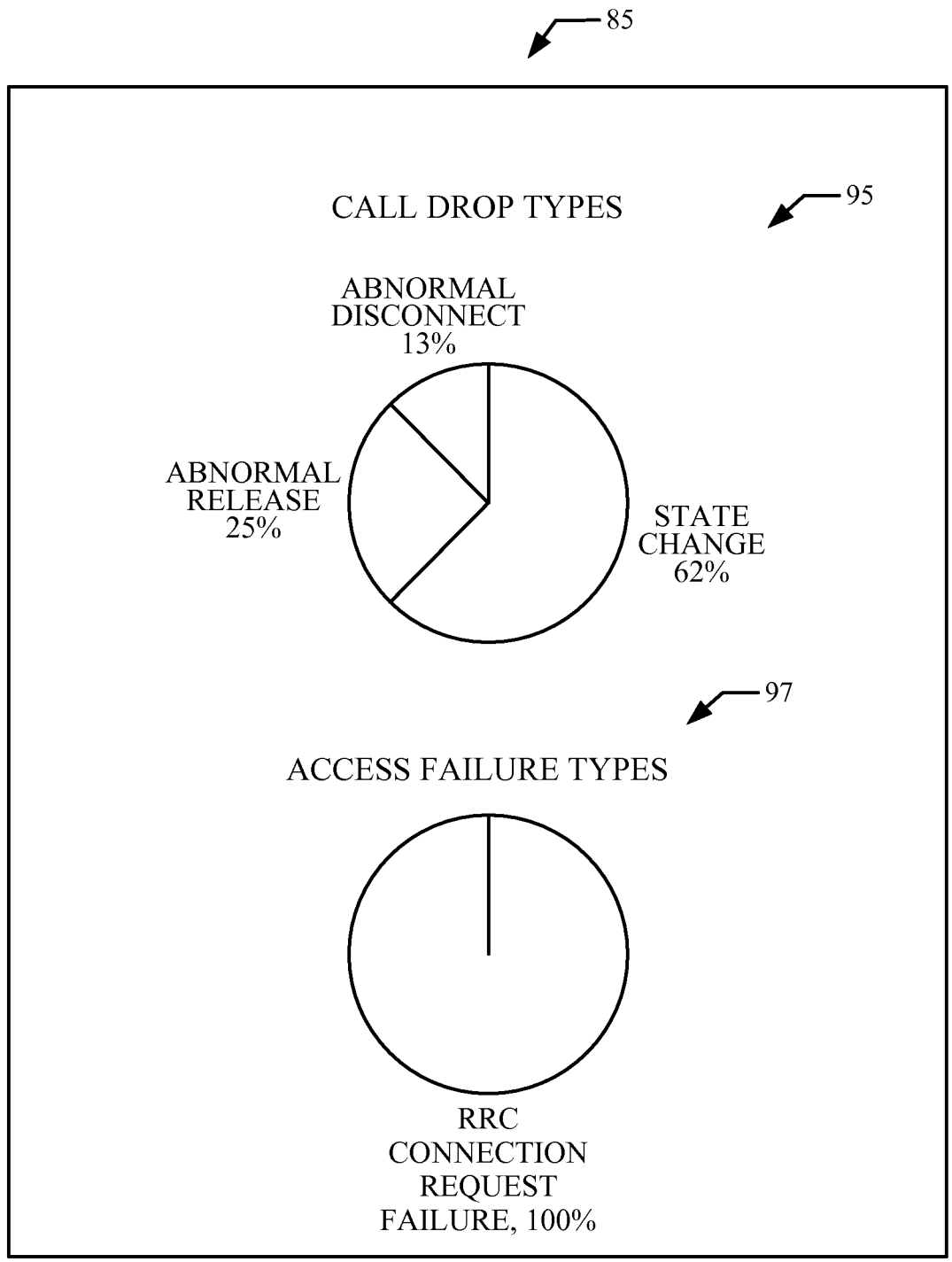
FIG. 6 is a representation of one embodiment of an output generated by a user manager, similar to FIG. 4, including pie charts.
Figure 7:
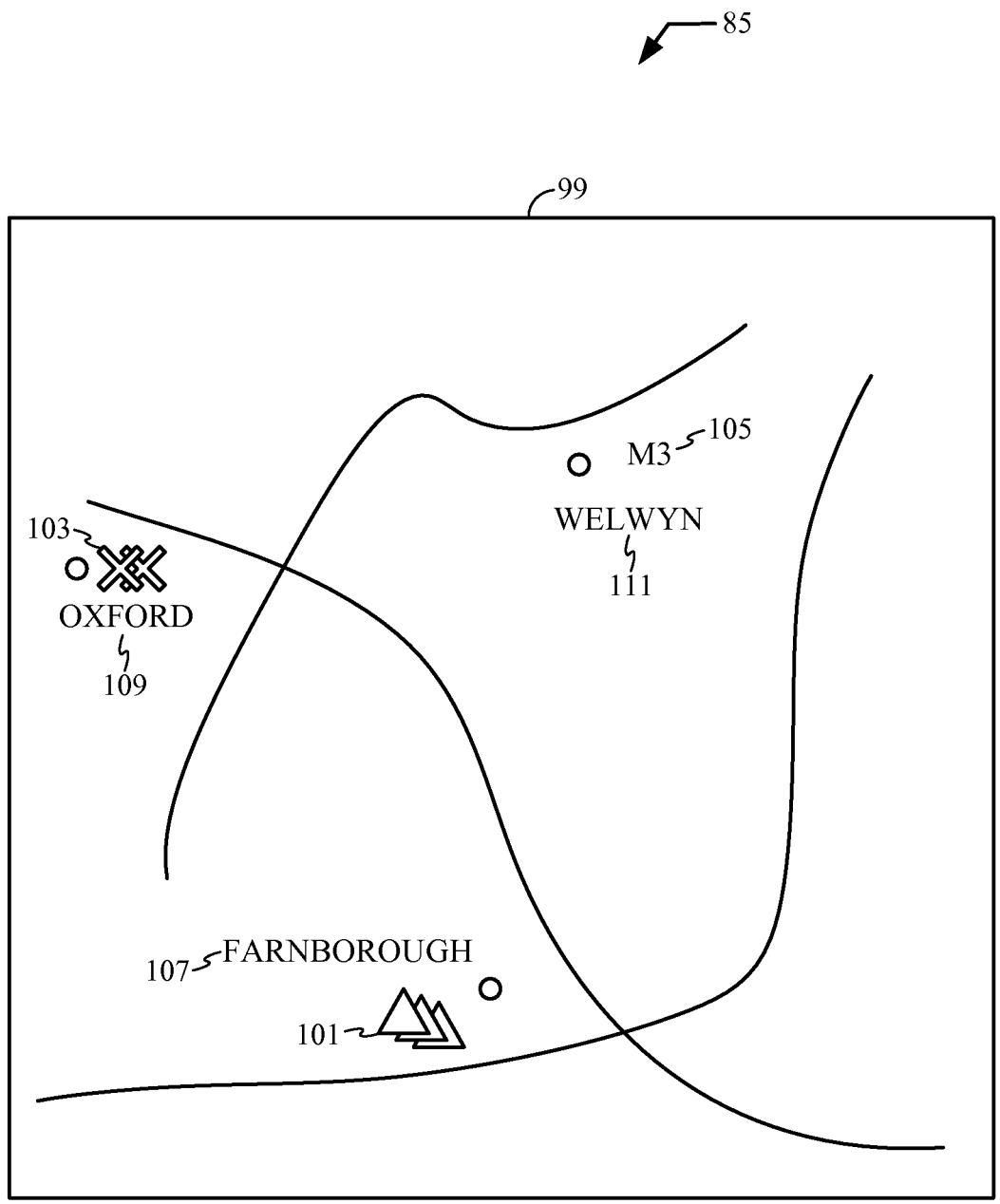
FIG. 7 is a representation of one embodiment of an output generated by a user manager, similar to FIG. 4, including an interactive geographic map with a representation of connection quality characteristics associated with geographic locations.

Referring to FIGS. 1-3, one embodiment of a connection quality determination system 10 includes a plurality of wireless devices 12,14,16,17,18 that each have a resident connection quality module 20 operable to transfer a respective wireless device communication log 22 to a user manager server 24 for determining a connection quality characteristic 26. For example, connection quality characteristic 26 may be in the form of an access failure metric and/or a call drop metric associated with a plurality of communication messages 28 transmitted from and/or received by the respective wireless devices 12,14,16,17,18 as reflected by log 22, as will be described in more detail below. The plurality of wireless devices 12,14,16,17,18 are located in a wireless network area 29 and communicate with each other and/or other computer devices via a wireless network 30. User manager 24 includes an analysis engine 32 that operates a remote connection quality module 34 to analyze, according to predetermined parameters, the plurality of communications messages 28 contained within the received log 22. For example, the predetermined parameters include identifying one or more predetermined sequences of communications messages, such as those predetermined sequences 36 defined by an access failure module 38 as corresponding to an access failure event, and such as those predetermined sequences 40 defined by a call drop module 42 as corresponding to a call drop event. Analysis engine 32 outputs a connection quality record 44 that includes the identified connection quality characteristic 26, if any, associated with the plurality of communications messages 28 from each log 22. Connection quality record 44 may be reviewed manually, such as by a technician, for evaluation of connection quality-related issues. Optionally, user manager 24 may include an optimization module 46 that analyzes each respective connection quality record 44, as well as other additional wireless device and network component configuration and performance data, to determine updated wireless device configurations 48 and/or network component configurations 50 to improve a given connection quality characteristic 26. User manager 24 may then transfer the updated configurations 48, 50 to the respective wireless device and/or network component in order to improve the connection quality characteristics associated with the system.

The wireless devices can include any mobile or portable communications device, such as cellular telephone 12, personal digital assistant 14, two-way text pager 16, a laptop computer 17, a tablet computer, and even a separate computer platform 18 that has a wireless communication portal, and which also may have a wired connection 19 to a network or the Internet. Additionally, the wireless device can be a remote-slave, or other device that does not have an end-user thereof but simply communicates data across the wireless network 30. For example, the wireless device may include a remote sensor, a diagnostic tool, a data relay, and the like. The apparatus and method of determining wireless connection quality based on communications messages logged on the wireless device can accordingly be applied to any form of wireless communications device or module, including a wireless communication portal, a wireless modem, PCMCIA cards, access terminals, personal computers, telephones, or any combination or sub-combination thereof.

In a cellular telephone embodiment, for example referring to FIG. 2, system 10 (FIG. 1) may include wireless network 30 connected to a wired network 52 via a carrier network 64. The use of cellular telecommunication pathways has been increasing because wireless devices, such as the plurality of cellular telephones 12 illustrated in FIG. 2, are being manufactured with increased computing capabilities and are becoming tantamount to personal computers and hand-held personal digital assistants ("PDAs"), communicating packets including voice and data over wireless network 30. These "smart" cellular telephones 12 have installed application programming interfaces ("APIs") 54 onto their local computer platform 56 that allow software developers to create software applications that operate on the cellular telephone, and control certain functionality on the device. FIG. 2 is a representative diagram that more fully illustrates the components of a cellular wireless network and interrelation of the elements of one embodiment of the present system. Cellular wireless network 52 is merely exemplary and can include any system whereby remote modules, such as wireless devices 12,14,16, 17,18, communicate over-the-air between and among each other and/or between and among components of a wireless network 30, including, without limitation, wireless network carriers and/or servers.

In system 52, user manager 24 can be in communication over a LAN network 58 with a separate data repository 60 for storing the data gathered from the remote wireless devices 12,14,16,17,18, such as the respective communication logs 22. Further, a data management server 62 may be in communication with user manager 24 to provide post-processing capabilities, data flow control, etc. User manager 24, data repository 60 and data management server 62 may be present on the cellular network 100 with any other network components that are needed to provide cellular telecommunication services. User manager 24, and/or data management server 62 communicate with carrier network 64 through a data link 66, such as the Internet, a secure LAN, WAN, or other network. Carrier network 64 controls messages (generally being data packets) sent to a mobile switching center ("MSC") 68. Further, carrier network 64 communicates with MSC 68 by a network 70, such as the Internet, and/or POTS ("plain old telephone service"). Typically, in network 70, a network or Internet portion transfers data, and the POTS portion transfers voice information. MSC 68 may be connected to multiple base stations ("BTS") 72 by another network 74, such as a data network and/or Internet portion for data transfer and a POTS portion for voice information. BTS 72 ultimately broadcasts messages wirelessly to the wireless devices, such as cellular telephones 12, by short messaging service ("SMS"), or other over-the-air methods.

Further, each wireless device, such as a plurality of cellular telephones 12 in this cellular telephone embodiment, has computer platform 56 that can transmit data across wireless network 30, and that can receive and execute software applications and display data transmitted from user manager 24 or another computer device connected to wireless network 30. Computer platform 52 also includes an application-specific integrated circuit ("ASIC") 76, or other chipset, processor, microprocessor, logic circuit, or other data processing device. ASIC 76 or other processor may execute application programming interface ("API") layer 54 that interfaces with any resident programs, such as connection quality module 20, in a memory 78 of the wireless device. API 54 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices. Memory 78 may include read-only and/or random-access memory (RAM and ROM), EPROM, EEPROM, flash cards, or any memory common to computer platforms. Computer platform 56 also includes a local database 80 that can hold the software applications, files, or data not actively used in memory 78, such as the software applications or data downloaded from user manager 24. Local database 80 typically includes one or more flash memory cells, but can be any secondary or tertiary storage device, such as magnetic media, EPROM, EEPROM, optical media, tape, or soft or hard disk. Additionally, local database 80 can ultimately hold a local copy of connection quality module 20 or agent, as is further described herein.

Referring to FIG. 3, in one embodiment, computer platform 56 includes the resident version of the connection quality module 20 that interfaces with API 54 and is executable by a communications processing engine 82, such as a processor associated with a chipset and/or ASIC 76 of the respective wireless device. Communications processing engine 82 includes various processing subsystems 84 embodied in hardware, firmware, software, and combinations thereof, that enable the functionality of the respective wireless device 12,14,16,17,18 and the operability of the respective device on wireless network 30, such as for initiating and maintaining communications, and exchanging data, with other networked devices. For example, communications processing engine 82 may include one or a combination of processing subsystems 84, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. In one embodiment, API 54 includes a class of software extensions that allow the resident version of the connection quality module 20 to access communications processing engine 82. These software class extensions can communicate with processing subsystems 84 on the wireless device, which allows both data reads and commands. For example, this class can send commands, including retrieval requests for communications messages 28 and/or communication logs 22, on behalf of the applications that invoke it. The class object can then forward the responses of the subsystems to the resident version of the connection quality module 20, or ultimately across wireless network 30 to user manager 24.

For example, in the described embodiments, the plurality of communications messages 28 may be generated by one or more of processing subsystems 84 and collected by another subsystem, such as a diagnostic subsystem. The resident version of connection quality module 20 executes through API 54 to collect this information and manages the transfer of this information to user manager 24.

Additionally, wireless device communications log 22 may be a collection of the plurality of communications messages 28, and may include addition wireless device-related information 86, as is discussed below. The plurality of communications messages 28 include, for example, the collection of messages transmitted from, received by, and generated within each respective wireless device 12,14,16,17,18. For example, communications messages 28 include standard over-the-air messages exchanged between the respective wireless device 12,14,16,17,18 and wireless network 30. Wireless network 30 includes any communications network operable, at least in part, for enabling wireless communications between a respective wireless device 12,14,16,17,18 and any other device connected to wireless network 30. Further wireless network 30 includes all network components, such as BTS 72, and all connected devices that form the network.

Further, the resident version of connection quality module 20 may execute to retrieve additional wireless device-related information 86 from computer platform 56 or elsewhere on the respective wireless device 12,14,16,17,18, and manage the transfer of this information to user manager 24. For instance, additional wireless device-related information 86 may include a wireless device identification 88, such as a mobile identification number, an International Mobile Subscriber Identity ("IMSI"), a Mobile Directory Number ("MDN") and any other unique identifying number associated with the respective wireless device. Also, additional wireless device-related information 86 may include position information 90, such as position/location information from at least one, or any combination, of a Global Positioning System ("GPS"), a Geographic Information System ("GIS"), a terrestrial network-based positioning system, a combined terrestrial network-based and GPS system, such as the QPoint™ Positioning Software and gpsOne™ hybrid Assisted GPS wireless location technology available from Qualcomm, Inc., of San Diego, Calif., and/or any other system or tool used to gather, transform, manipulate, analyze, and produce information relating to the location/position of the respective wireless device. Position information 90 may further include an identification of other network components having known locations, such as BTS 72, with which the respective wireless device 12,14,16,17,18 is in communication to thereby provide information about a relative position of the wireless device. Further, additional wireless device-related information 86 may include processing-related data generated by processing subsystems 84, or any other component of the respective wireless device, in the formation of and/or related to the communications messages 28.

Referring back to FIG. 1, user manager 24 may be at least one of any type of server, personal computer, mini-mainframes and the like. User manager 24 and its corresponding components can give a ready view of communication logs 22 collected from the wireless devices in any form, such as tables, maps, graphics views, plain text, or any other type of displayed, printed and/or interactive output.

Referring to FIGS. 4-7, in one embodiment output generated by user manager 24 may be in the form of a interactive report 85 having a plurality of drop-down menus 87 for obtaining more detailed information relating to the summary information provided by the report. For example, referring to FIG. 4, some of the summary information may include a table 89 that presents specific information relating to the wireless device and the connection quality characteristic. In another example, referring to FIGS. 5 and 6, some of the summary information may be presented in the form of bar charts 91, 93 and pie charts 95, 97 relating to different connection quality characteristics. In a further example, referring to FIG. 7, user manager 24 may generate a geographic map 99 that includes connection quality characteristic representations 101, 103, 105 associated with different geographic locations 107, 109, 111.

Referring back to FIG. 1, user manager 24 (or plurality of servers) can send software agents or applications, such as the resident connection quality module 20, to wireless devices 12,14,16,17,18 in the wireless network area 29 such that the wireless devices return data from their resident applications and subsystems. Wireless devices 12,14,16,17,18 may transmit data, such as communication logs 22, to user manager 24 or some other computer device on the network. User manager 24 utilizes communication logs 22 for purposes such as connection quality determinations, product set-ups, device and/or network diagnosis and configuration, and/or data mining. Further, there can be a separate servers or computer devices associated with user manager 24 that work in concert to provide data in usable formats to parties, and/or a separate layer of control in the data flow between the wireless devices 12,14,16,17,18 and user manager 24.

Additionally, as mentioned above, analysis engine 32 executes connection quality module 34 to review communications log 22 and generate connection quality record 44. Analysis engine 32 includes at least one of an application-specific integrated circuit ("ASIC"), a chipset, a processor, a microprocessor, a logic circuit, and any other data processing device. Connection quality module 34 may include software, hardware, firmware and generally any executable instructions operable by analysis engine 32. Connection quality module 34 may download the resident version of connection quality module 20 to each wireless device 12,14,16,17,18. Alternatively, the resident version of connection quality module 20 may be loaded onto the respective wireless device during the initial assembly process, or via serial connections during a configuration process. Further, connection quality module 34 is executable by user manager 24 to manage the collection of communications logs 22 from wireless devices 12,14,16,17, 18. Connection quality module 34 may "pull" the logs 22 based on commands from a user, or the logs may be "pushed" from the respective devices at predetermined times or upon reaching predetermined memory/data storage levels.

Access failure module 38 includes instructions executable by analysis engine 32 to determine if one or more predetermined sequences of communications messages 36 exist within communications log 22, thereby indicating an access failure event. Such an access failure event is reported as a type of connection quality characteristic 26 in record 44 associated with log 22. For example, in one embodiment, access failure events are based on a relationship between access attempts and access successes. As such, connection quality characteristic 26 may include any type of metric associated with the access failure event, such as a sum of access failure events, a rate of access failure events, etc.

In one embodiment, the access failure-related predetermined sequence of communications messages 36 include messages that relate to a difference between an access attempt and an access success. An access attempt comprises a sequence of communication messages that include a first type of a radio connection request message having an originating conversational call, a terminating conversational call, or an emergency call as an establishment cause. Further, an access attempt comprises a sequence of communication messages that include a second type of radio connection request message having a registration as the establishment cause and followed by one of a connection management service request signaling message or a setup signaling message, without any new radio connection request message in between. Additionally, the access success sequence of messages comprises: (1) an alerting signaling message associated with one of the first type or the second type of radio connection request messages, respectively; or (2) a connect signaling messages associated with one of the first type or the second type of radio connection request message, respectively, that do not have an associated alerting signaling message; or (3) a connect acknowledgement signaling message associated with one of the first type or the second type of radio connection request message, respectively, that does not have an associated alerting signaling message or an associated connect signaling message.

Similarly, call drop module 42 includes instructions executable by analysis engine 32 to determine if one or more predetermined sequences of communications messages 40 exist within communications log 22, thereby indicating a call drop. Such a call drop event is reported as a type of connection quality characteristic 26 in record 44 associated with log 22. For example, in one embodiment, call drop events are based on state changes, abnormal releases and abnormal disconnects that occur after an access success. As such, connection quality characteristic 26 may include any type of metric associated with the call drop event, such as a sum of call drop events, a rate of call drop events, etc.

In one embodiment, the call drop-related predetermined sequences of communications messages 40 are messages, associated with an access success, that relate to an abnormal release, an abnormal disconnect, and/or a state change. An abnormal release comprises a release signaling message having an abnormal cause code and associated with an alerting signaling message corresponding to the access success, and which is not preceded by an associated disconnect signaling message. An abnormal disconnect comprises a disconnect signaling message having an abnormal cause code and associated with the access success, and which is not preceded by any associated release signaling message. For both a release message and a disconnect message, a normal cause code is associated with a proper functioning of the system. For example, a normal cause code may be associated with a successful connection, normal call clearing, the call being rejected, or other unspecified causes. In particular, as identified in the 3GPP specification 24.008, and as utilized in signaling messages in the UMTS protocol, normal cause codes include, at least, cause numbers: 0, 2, 4, 5, 7, 9-16, 20, 21, 23, 24 and 31. In contrast, an abnormal cause code is associated with some error in the communications message and/or within the communications network, and/or with some call disabling event. For example, an abnormal cause code may be associated with an unacceptable channel, a busy user, a changed number, an operator determined barring, etc. In particular, as identified in the 3GPP specification 24.008, and as utilized in signaling messages in the UMTS protocol, abnormal cause codes include, at least, all cause numbers not considered as normal cause codes, such as cause numbers: 1, 3, 6, 8, 17-19, 22, 25-30, 32-127. A call drop state change comprises a change from an active state to an idle state, except when there is a normal release signaling message or a normal disconnect signaling message between the state change messages.

Further, the connection quality record 44 may further associate the access failure and call drop types of connection quality characteristics 26 with additional information from the respective wireless device(s), such as the respective wireless device ID 88, position information 90 and other wireless device-related information 86 (see FIG. 3). This additional associated information may be useful in trouble-shooting connection quality issues and identifying problem areas and/or devices, such as when logs 22 from a plurality of wireless devices are analyzed and the results output in a manner that correlates connection quality characteristics 26 and geographic position 90. As such, connection quality record 44 includes any form of output that represents a connection quality characteristic 26, as well as any other related data, associated with the plurality of communications messages 28 from communications log 22 of one or more respective wireless devices.

Additionally, as mentioned above, optimization module 46 may access connection quality record 44 and apply predetermined algorithms or programs to optimize the settings of one or more device- and/or network-related configurations to improve the connection quality, such as by reducing access failures and/or call drops. Optimization module 46 may include any hardware, software, firmware and/or other set of executable instructions operable to analyze connection quality record 44 and determine revised network-specific and/or wireless device-specific configuration changes to reduce the occurence of access failure events and/or call drop events. Additionally, optimization module 46 may be operable to initiate further communications with a respective wireless device 12,14,16,17,18 and/or a network component, such as a base station, to retrieve additional communications-related data associated with the plurality of communications messages 28, in order to perform further analysis and optimization of one or more connection quality characteristics 26. The optimizations performed by optimization module 46 may also be performed all or in part by a technician manually reviewing the connection quality record 44, and any associated communications-related data.

Figure 8:
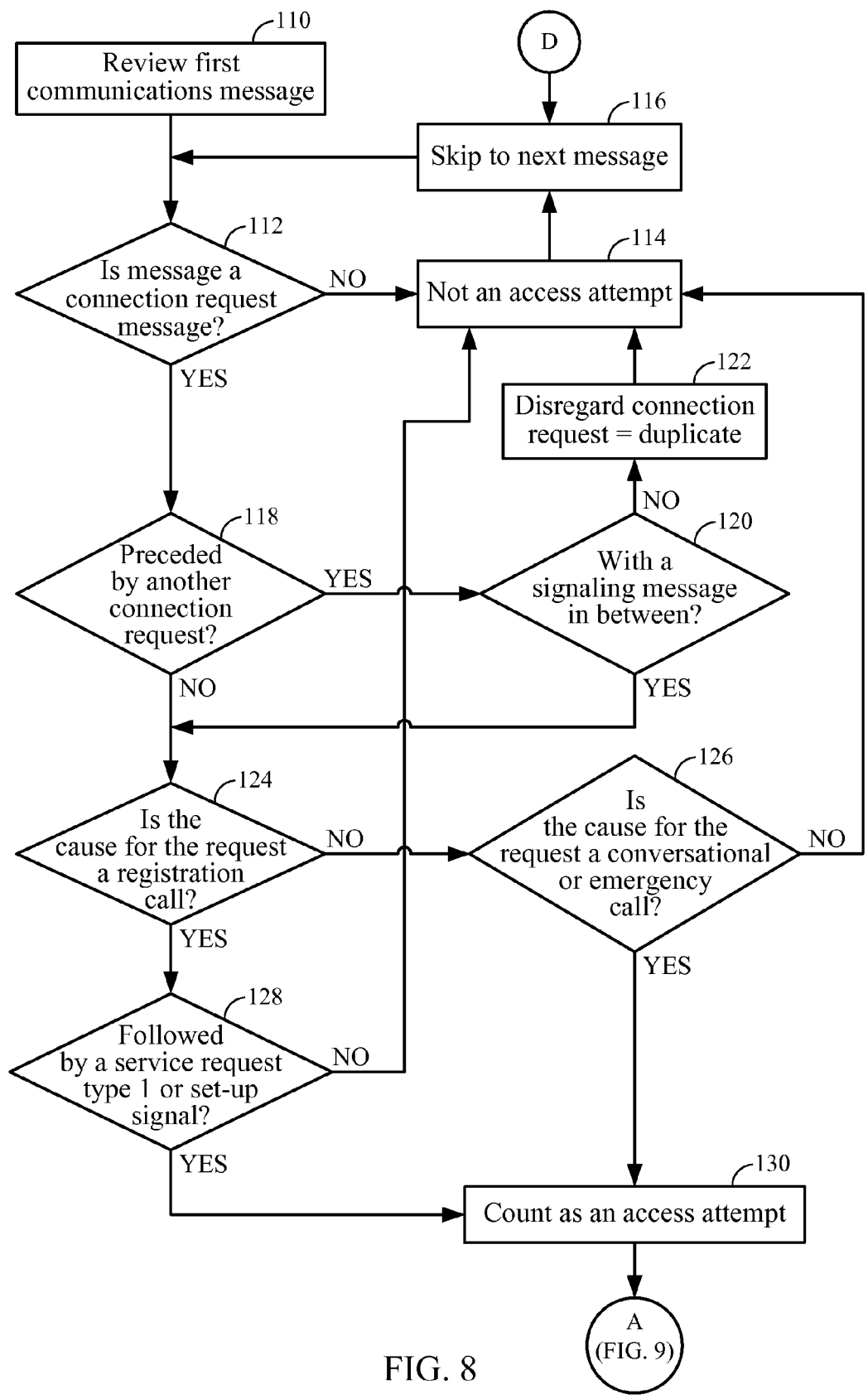
FIG. 8 is a flowchart of one embodiment of a method for determining an attempt, by a wireless device, to establish communications with a wireless network based on communications messages.

For example, referring to FIG. 8, after receiving a plurality of communications messages 28 logged by a respective wireless device 12,14,16,17,18, one embodiment of a method of determining an access attempt includes reviewing a first communications message to determine if it is a connection request message (Blocks 110-112). If it is not a connection request message, then the method identifies the message as not being an access attempt (Block 114), skips to the next message (Block 116) and performs the same review. If it is a connection request message, then the method involves determining if it was preceded by another connection request message (Block 118).

If it is preceded by another connection request, then the method determines if there is a signaling message between the two connection request messages (Block 120). If there is no signaling message between the connection request messages, then the connection request message being analyzed, i.e. the latter connection request message, is disregarded as a duplicate (Block 122), is not considered as an access attempt (Block 114) and the method skips to the next message (Block 116). If there is a signaling message between the two connection request messages, then the two connection requests are for distinct access attempts, so then the cause code of the connection request under examination is further analyzed to determine if it is a registration call or a conversational/emergency call (Blocks 124, 126).

Similarly, if the connection request message is not preceded by another connection request message, then the method determines if the cause of the connection request message is a registration call or a conversational/emergency call (Blocks 124, 126).

If it is neither one of a registration call nor a conversational/emergency call, then the method identifies the message as not being an access attempt and skips to the next message (Blocks 114-116).

If the connection request is a registration call, then the method determines if the connection request is followed by a service request, type 1 or a set-up signal (Block 128). If it is not followed by a service request, type 1 or a set-up signal, then the method identifies the message as not being an access attempt and skips to the next message (Blocks 114-116). If it is followed by a service request, type 1 or a set-up signal, then the method counts the connection request message as an access attempt (Block 130).

On the other hand, if the connection request message is an originating or terminating conversational call, or an emergency call, then the method counts the connection request message as an access attempt (Block 130).

Referring to FIG. 13, in continuing with the analysis of a sequence of messages that is counted as an access attempt (FIG. 8, Block 126), one embodiment of a method for determining an access success continues by determining if the connection request has an associated alerting signaling message (Block 132). If there is an associated alerting signaling message, then the method counts the sequence as an access success (Block 134). If there is not an associated alerting signaling message, then the method includes a determination as to whether there is an associated connect signaling message (Block 136). If there is an associated connect signaling message, then the method counts the sequence as an access success (Block 134). If there is not an associated connect signaling message, then the method includes a determination as to whether there is an associated acknowledgement signaling message (Block 138). If there is an associated acknowledgement signaling message, then the method counts the sequence as an access success (Block 134). If there is not an associated acknowledgement signaling message, then the method counts the attempt as an access failure (Block 140) and skips to the next message (Block 116) to return to the flow of FIG. 8.

Figure 9:
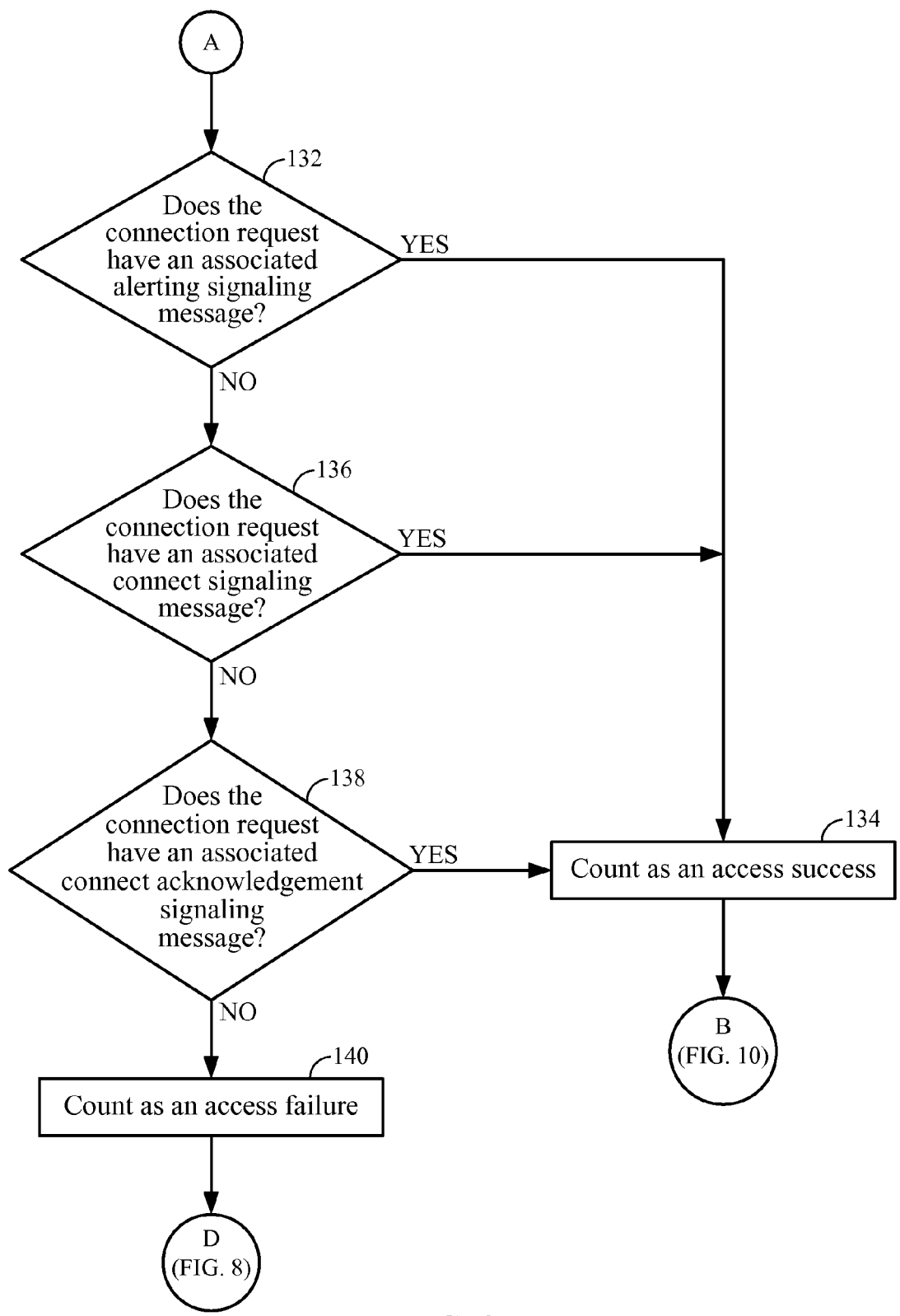
FIG. 9 is a flowchart of one embodiment of a method for determining a failure and/or and a success of the access attempt of FIG. 4.
Figure 10:
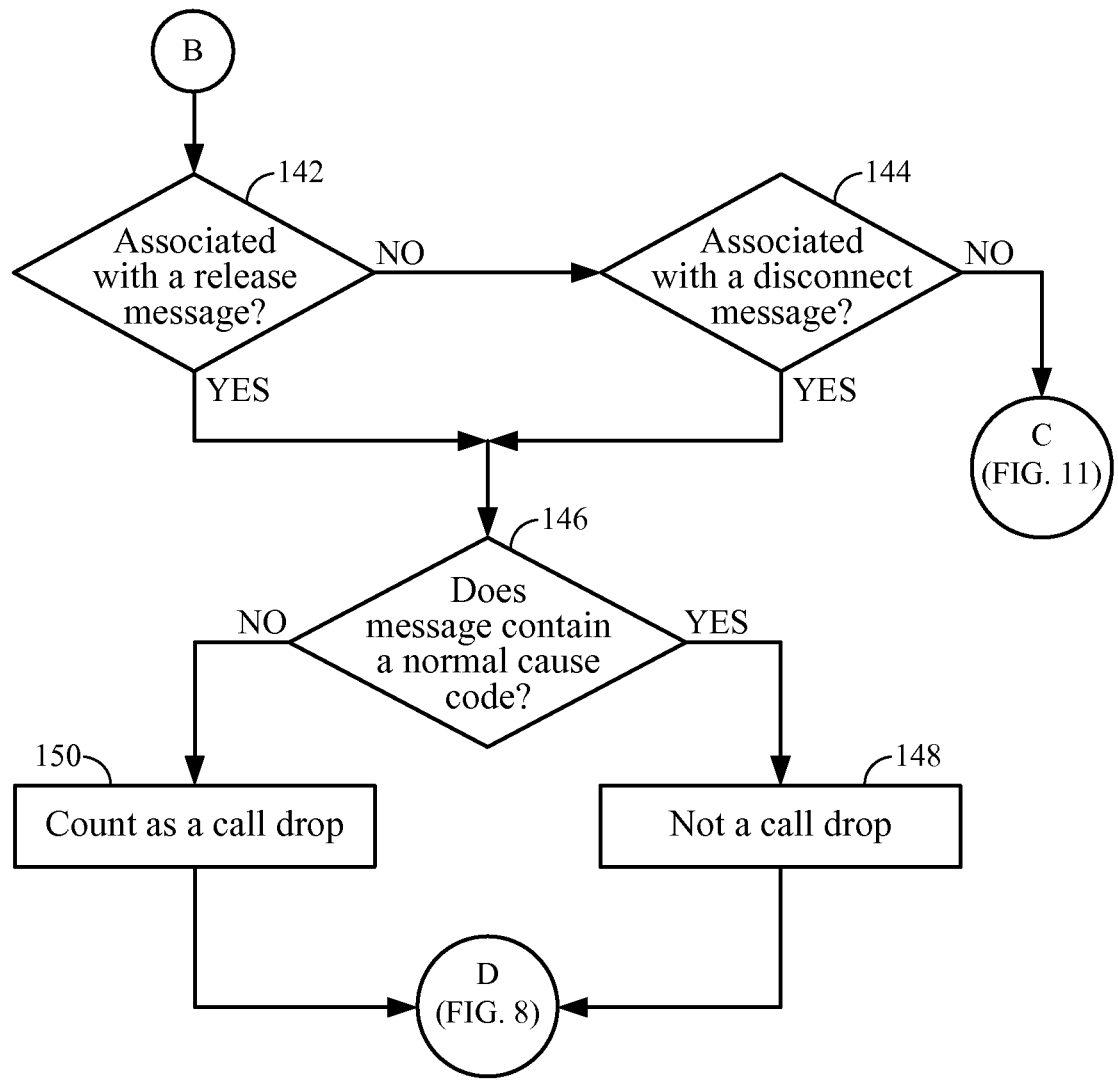
FIG. 10 is a flowchart of one embodiment of a method for determining a call drop, based on release and disconnect messages, associated with the access success of FIG. 5.

Referring to FIG. 10, in continuing with the analysis of a sequence of messages that is counted as an access success (FIG. 9, Block 134), one embodiment of a method for determining a call drop continues by determining if the connection request is associated with a release message or a disconnect message (Blocks 142, 144).

If the connection request is associated with either a release message or a disconnect message, then the method determines if the respective release or disconnect message contained a normal cause code (Block 146). If there is a normal cause code, then the sequence is not associated with a call drop (Block 148), and the message is skipped and the process moves to the next message (FIG. 8, Block 116). If there is not a normal cause code, then the method counts the sequence as a call drop (Block 150) and skips to the next message to evaluate the next sequence of messages (FIG. 8, Block 116).

Figure 11:
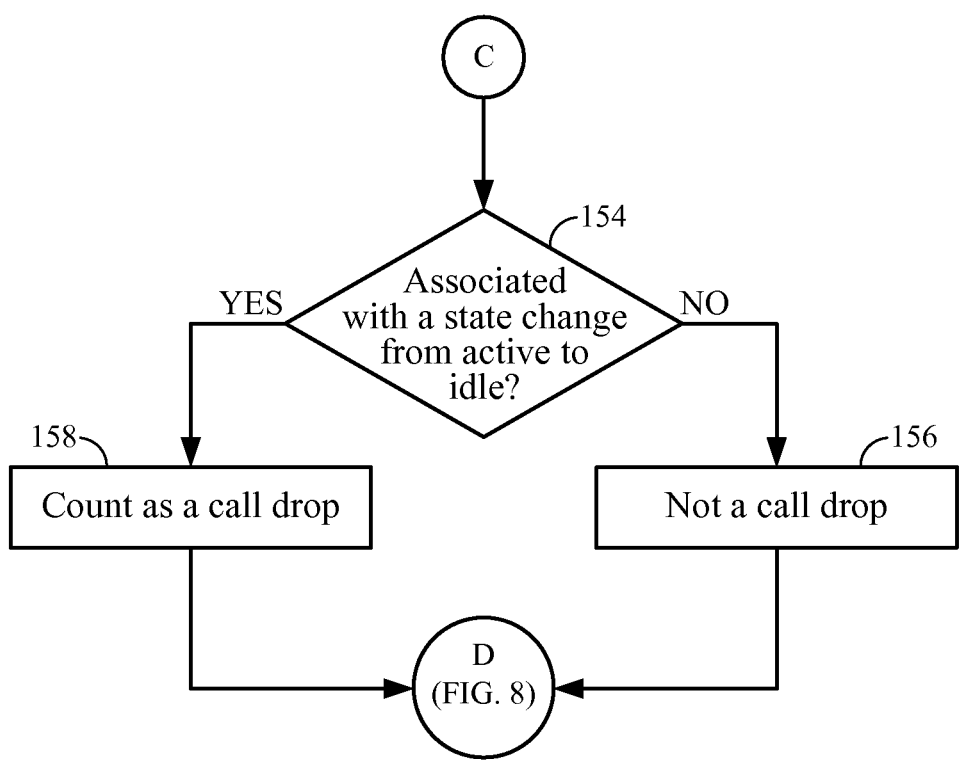
FIG. 11 is a flowchart of one embodiment of a method for determining a call drop, based on a state change, associated with the access success of FIG. 5.

If the connection request is associated with neither a release message nor a disconnect message, then the method proceeds to determine if the connection request message is associated with a state change (FIG. 11, Block 154).

Referring to FIG. 11, if the connection request is associated with neither one of an abnormal release message nor an abnormal disconnect message (from FIG. 10), then the method proceeds to determine if the connection request is associated with a state change from active to idle (Block 154). If there is no state change from active to idle, then the method determines that the sequence is not a call drop (Block 156) and the method proceeds to the next message (FIG. 8, Block 116). If there is a state change from active to idle, then the method determines that the sequence is a call drop (Block 158) and the method proceeds to the next message (FIG. 8, Block 116).

In one embodiment associated with a UMTS protocol, the user manager or other computer device execute the described method to determine a UMTS access failure rate and a UMTS call drop rate. The UMTS access failure rate is defined as follows:

UMTS Access Failure Rate[%]=(ΣAccess Attempt− ΣAccess Success)/(ΣAccess Attempt)*100% where:

ΣAccess Attempt= a sum of the number of unique RRC_Connection_Request Messages with an ESTABLISHMENTCAUSE= ORIGINATING_CONVERSATIONAL_CALL, TERMINATING_CONVERSATIONAL_CALL, or EMERGENCY_CALL

+ a sum of the number of unique RRC_Connection_Request Messages with the ESTABLISHMENTCAUSE=REGISTRATION followed by either: CM_SERVICE_REQUEST_NAS_Signaling with SERV_TYPE=1, or SETUP_NAS_Signaling message, without any new RRC_Connection_Request Message in between;

Note: If a RRC_Connection_Request Message is followed by another RRC_Connection_Request Message without a RRC Signaling Message in between, then the second RRC_Connection_Request Message is considered as a duplicate.

ΣAccess Success= a sum of the number of ALERTING_NAS_Signaling messages associated with the RRC_Connection_Request messages counted above

+ a sum of the number of CONNECT_NAS_Signaling messages without the ALERTING_NAS_Signaling messages associated with the RRC_Connection_Request messages counted above

+ a sum of the number of CONNECT_ACK_NAS_Signaling messages without the ALERTING_NAS_Signaling nor the CONNECT_NAS_Signaling messages associated with the RRC_Connection_Request messages counted above. Similarly, the UMTS call drop rate is defined as follows:

UMTS Call Drop Rate[%]=(ΣCall Drops due to State Change+ΣABNORMAL RELEASE_NAS_Signaling+ΣABNORMAL DISCONNECT_ NAS_Signaling)/(ΣAccess Success)*100% where:

ΣAccess Success=same as defined above;

ΣCall Drops due to State Change= a sum of the number of NAS_MM state changes from CONNECTION_ACTIVE to IDLE with the following exceptions: (1) when there is a RELEASE_NAS_Signaling Message between the state changes; (2) when there is a DISCONNECT_NAS_Signaling Message between the state changes; and (3) when the call is not counted in as an Access Success. For example, if the ESTABLISHMENTCAUSE is not one of the causes listed above, e.g. a packet data call could have a ESTABLISHMENTCAUSE=ORIGINATING_ INTERACTIVE_CALL.

ΣABNORMAL RELEASE_NAS_Signaling= a sum of the number of RELEASE_NAS_Signaling Messages w/CAUSE≠NORMAL, which is associated with the ALERTING_NAS_Signaling messages counted as an Access Success and not preceded by any associated DISCONNECT_NAS_Signaling message;

ΣABNORMAL DISCONNECT_NAS_Signaling= a sum of the number of DISCONNECT_NAS_Signaling Messages w/CAUSE≠NORMAL, which is associated with an ALERTING_NAS_Signaling message counted as an Access Success and not preceded by any associated RELEASE_NAS_Signaling message;

where a CAUSE=NORMAL for RELEASE_NAS_Signaling and DISCONNECT_NAS_Signaling Messages are related to: a Successful Connection, Cause Code: 0; a Normal Call Clearing, Cause Code: 16; a Call Rejected, Cause Code: 21 (Note: This is a user initiated event); and an unspecified NORMAL Cause Code: 2, 4-5, 7, 9-15, 20, 23-24, 31; and where a CAUSE≠NORMAL for RELEASE_NAS_Signaling and DISCONNECT_NAS_Signaling Messages having all Cause Codes not listed above as NORMAL.

Referring to FIGS. 12-19, various examples of UMTS access attempts and access successes are illustrated. In each of these cases, downwardly extending arrow 170 represents a timeline of the transmission or receipt of messages at wireless device 12.

Referring to FIG. 12, this sequence of messages 28 represents a single access attempt and a single access success because the connection request message 172 with the proper establishment cause 174 was properly followed by an alerting message 176.

Referring to FIG. 13, this sequence of messages 28 represents a single access attempt and a single access success because the connection request message 172 with the proper establishment cause 174 was properly followed by an alerting message 176, and because the second connection message 172 is considered a duplicate because there is no signaling message between the two connection messages.

Referring to FIG. 14, this sequence of messages 28 represents two access attempts with one access failure and one access success. The first access attempt failed because none of the following are associated with the first connection request message 172: ALERTING_NAS_Signaling message, CONNECT_NAS_Signaling message, CONNECT_ ACK_NAS_Signaling message. Further, the RRC_Connection_Setup message is a radio resource control ("RRC") signaling message 178 that, since it occurs between two connection request messages, is interpreted to mean that the first access attempt has ended. The second access attempt was successful because of the alerting message 176.

Referring to FIG. 15, this sequence of messages 28 represents two access attempts with one access failure and one access success. The first access attempt failed because none of the following are associated with the first connection request message 172: ALERTING_NAS_Signaling message, CONNECT_NAS_Signaling message, CONNECT_ ACK_NAS_Signaling message. Further, the WCDMA: System information block of messages is a signaling message that, since it occurs between two connection request messages, is interpreted to mean that the first access attempt has ended. The second access attempt was successful because of the alerting message 176.

Figures 16, 17:
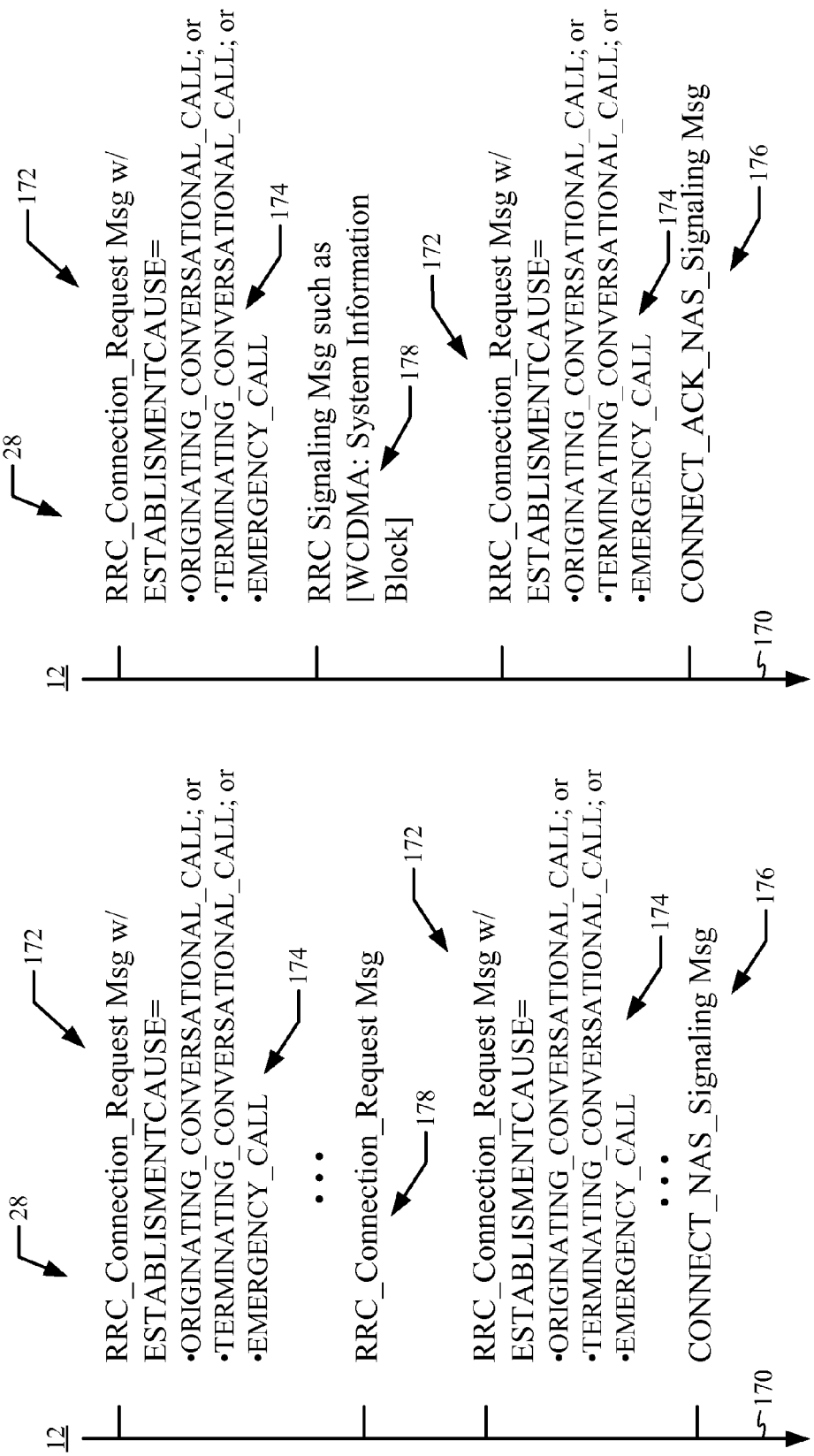
FIG. 16 is yet another example of a sequence of communications messages associated with two access attempts, including one access failure.
FIG. 17 is still another example of a sequence of communications messages associated with two access attempts, including one access failure.

Referring to FIG. 16, this sequence of messages 28 represents two access attempts with one access failure and one access success. The first access attempt failed because none of the following are associated with the first connection request message 172: ALERTING_NAS_Signaling message, CONNECT_NAS_Signaling message, CONNECT_ACK_NAS_Signaling message. Further, the RRC_Connection_Setup message is a signaling message 178 that, since it occurs between two connection request messages, is interpreted to mean that the first access attempt has ended. The second access attempt was successful because of the associated connect signaling message 180.

Referring to FIG. 17, this sequence of messages 28 represents two access attempts with one access failure and one access success. The first access attempt failed because none of the following are associated with the first connection request message 172: ALERTING_NAS_Signaling message, CONNECT_NAS_Signaling message, CONNECT_ACK_NAS_Signaling message. Further, the WCDMA: System information block of message is a signaling message 178 that, since it occurs between two connection request messages, is interpreted to mean that the first access attempt has ended. The second access attempt was successful because of the associated connect acknowledgement signaling message 182.

Referring to FIG. 18, this sequence of messages 28 represents two access attempts with one access failure and one access success. The first access attempt, comprising the first connection request message 172 with establishment cause 174 being a "registration" and the corresponding service request message 184, failed because none of the following are associated with the first connection request message 172: ALERTING_NAS_Signaling message, CONNECT_NAS_Signaling message, CONNECT_ACK_NAS_Signaling message. The second access attempt, comprising the second connection request message 172 with establishment cause 174 being a "registration" and the corresponding setup message 188, was successful because of the associated alerting message 176.

Referring to FIG. 19, this sequence of messages 28 represents one access attempt with no access failures and one access success. The first connection request message 172 with establishment cause 174 in the form of a "registration" is not counted as an access attempt because it is not followed by a service type 186 being of a "Type 1." The second access attempt, i.e. the second connection request 172, was successful because of the associated alerting message 176.

Figures 20, 21:
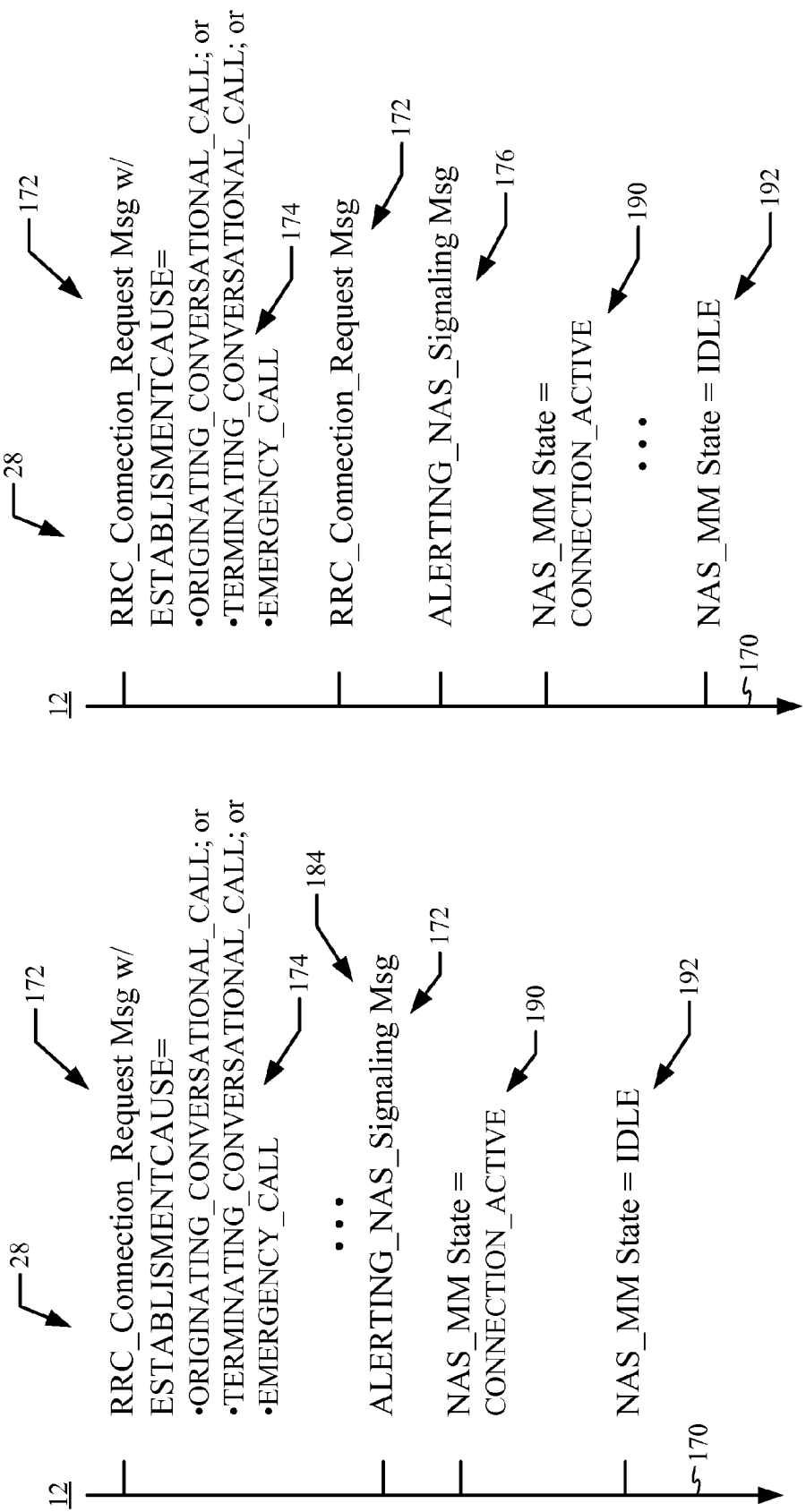
FIG. 20 is an example of a sequence of communications messages associated with an access success and a call drop, due to a state change.
FIG. 21 is another example of a sequence of communications messages associated with an access success and a call drop, due to a state change.

Referring to FIGS. 20-31, various examples of UMTS call drops are illustrated. Referring to FIG. 20, this sequence of messages 28 represents one access success with no access failures and one call drop. The access success was counted because the connection request message 172 was followed by an alerting message 176. The call drop occurs based on the change from the active state 190 to the idle state 192 occurred without a normal release message or a normal disconnect message between the state change messages.

Referring to FIG. 21, this sequence of messages 28 represents one access success with no access failures and one call drop. The access success was counted because the first connection request message 172 was followed by an alerting message 176. The second connection request message 172 is a duplicate because there is no RRC signaling message between the two connection request messages 172. The call drop occurs based on the change from the active state 190 to the idle state 192 without a normal release message or a normal disconnect message between the state change messages.

Referring to FIG. 22, this sequence of messages 28 represents one access success with one access failures and one call drop. The first connection request 172 resulted in an access failure because it was not associated with one of an alerting message 176, a connect message 180 or a connecting acknowledgement message 182. Further, the signaling message 178 in the form of a connection setup message is between the two connection request messages, thereby resulting in an attempt and a failure. The access success was counted because the second connection request message 172 was followed by an alerting message 176. The call drop occurs based on the change from the active state 190 to the idle state 192 without a normal release message or a normal disconnect message between the state change messages.

Referring to FIG. 23, this sequence of messages 28 represents one access success with no access failures and one call drop. The access success was counted because the first connection request message 172 was followed by an alerting message 176. The call drop occurs based on the associated abnormal release message 194.

Figures 24, 25:
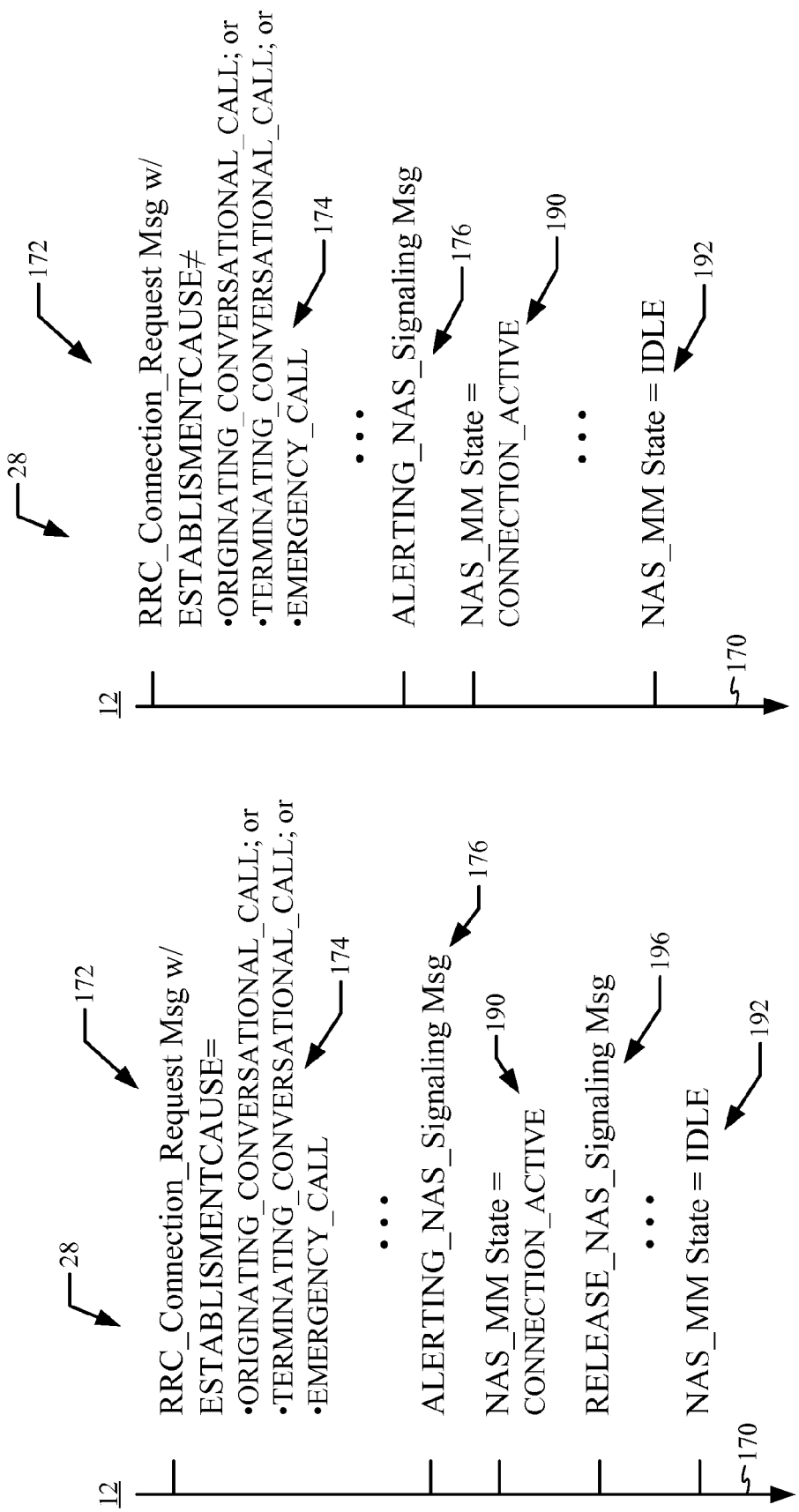
FIG. 24 is an example of a sequence of communications messages associated with an access success without a call drop, due to a normal release message.
FIG. 25 is example of a sequence of communications messages associated with neither an access success nor a call drop, due to a non-qualifying type of establishment cause contained in the connection request message.

Referring to FIG. 24, this sequence of messages 28 represents one access success with no access failures and no call drops. The access success was counted because the first connection request message 172 was followed by an alerting message 176. The normal release message 196 between the state change from an active state 190 to an idle state 192 precludes a call drop event.

Referring to FIG. 25, this sequence of messages 28 represents no access successes with no access failures and no call drops. The connection request message 172 followed by the alerting message 176 is not counted because the establishment cause 174 of the connection request does not meet the requirements to be counted as an attempt. Thus, the state change from an active state 190 to an idle state 192 is not relevant since there is not an access success.

Figures 26, 27:
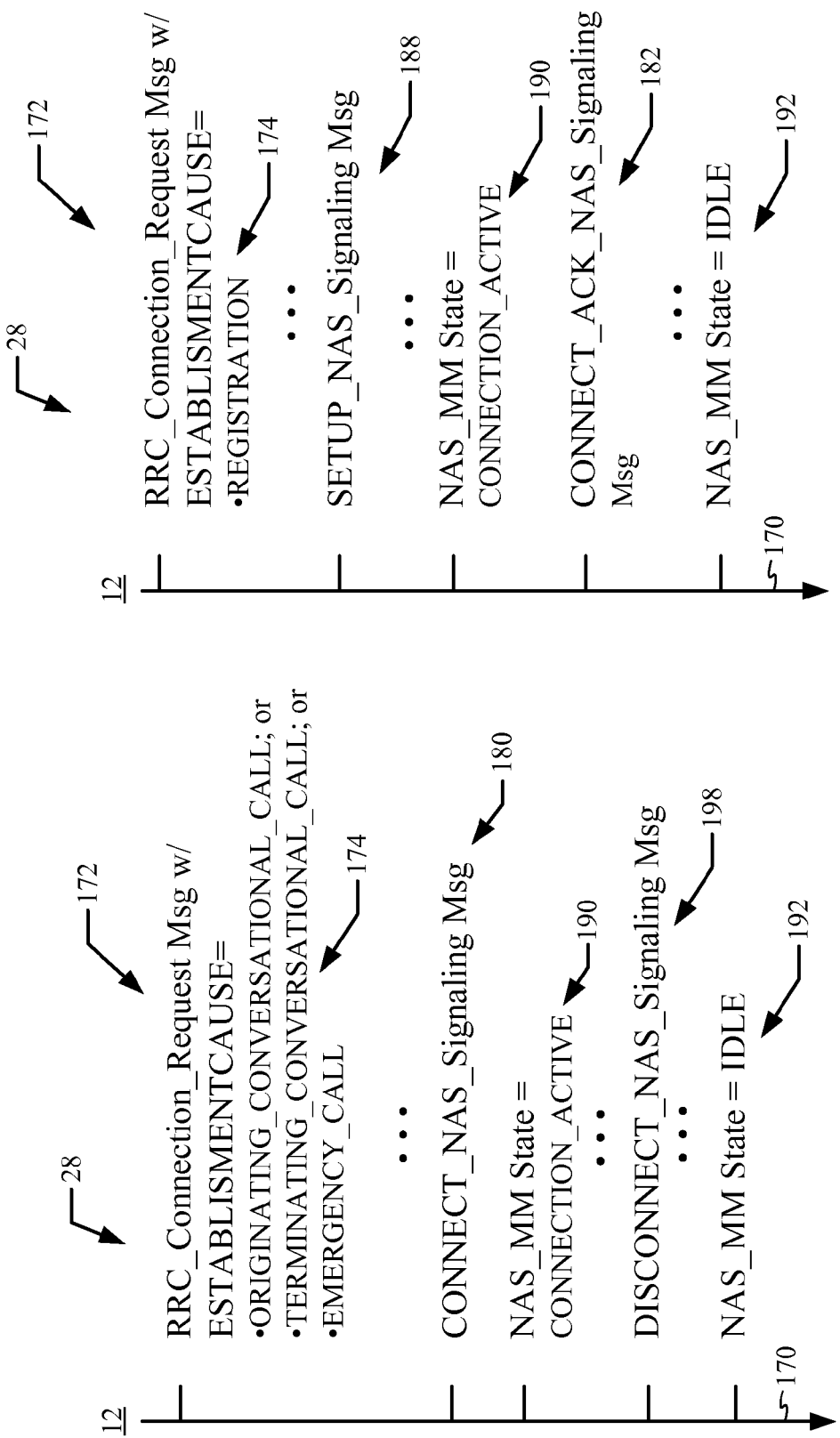
FIG. 26 is another example of a sequence of communications messages associated with an access success without a call drop, due to a normal disconnect message.
FIG. 27 is yet another example of a sequence of communications messages associated with an access success and a call drop, due to a state change.

Referring to FIG. 26, this sequence of messages 28 represents one access success with no access failures and no call drops. The access success was counted because the first connection request message 172 was followed by a connect message 180. The normal disconnect message 198 between the state change from an active state 190 to an idle state 192 precludes a call drop event.

Referring to FIG. 27, this sequence of messages 28 represents one access success with no access failures and one call drop. The first connection request message 172, with a "registration" establishment cause 174, followed by setup message 188 constitutes and access attempt. The associated connect acknowledgement message 182 thereby results in an access success. A call drop event occurs because of the lack of a normal disconnect or a normal release between the state change from an active state 190 to an idle state 192.

Referring to FIG. 28, this sequence of messages 28 represents one access success with no access failures and one call drop. The access success was counted because the first connection request message 172 was properly followed by an alerting message 176. A call drop event occurs because of the presence of the abnormal disconnect message 200 after the access success.

Referring to FIG. 29, this sequence of messages 28 represents one access success with no access failures and one call drop. The access success was counted because the first connection request message 172 was properly followed by an alerting message 176. Even though a normal release message 196 occurs after the access success, a call drop event occurs because an abnormal disconnect message 200 occurs prior to the normal release message.

Referring to FIG. 30, this sequence of messages 28 represents one access success with no access failures and no call drops. The access success was counted because the first connection request message 172 was properly followed by an alerting message 176. Even though an abnormal release message 196 occurs between the state change from an active state 190 to an idle state 192, a call drop event does not occur because a normal disconnect message 198 occurs prior to the abnormal release message.

Referring to FIG. 31, this sequence of messages 28 represents one access success with no access failures and no call drops. The access success was counted because the first connection request message 172 was properly followed by an alerting message 176. Even though an abnormal disconnect message 200 occurs between the state change from an active state 190 to an idle state 192, a call drop event does not occur because a normal release message 196 occurs prior to the abnormal disconnect message.

Figure 32:
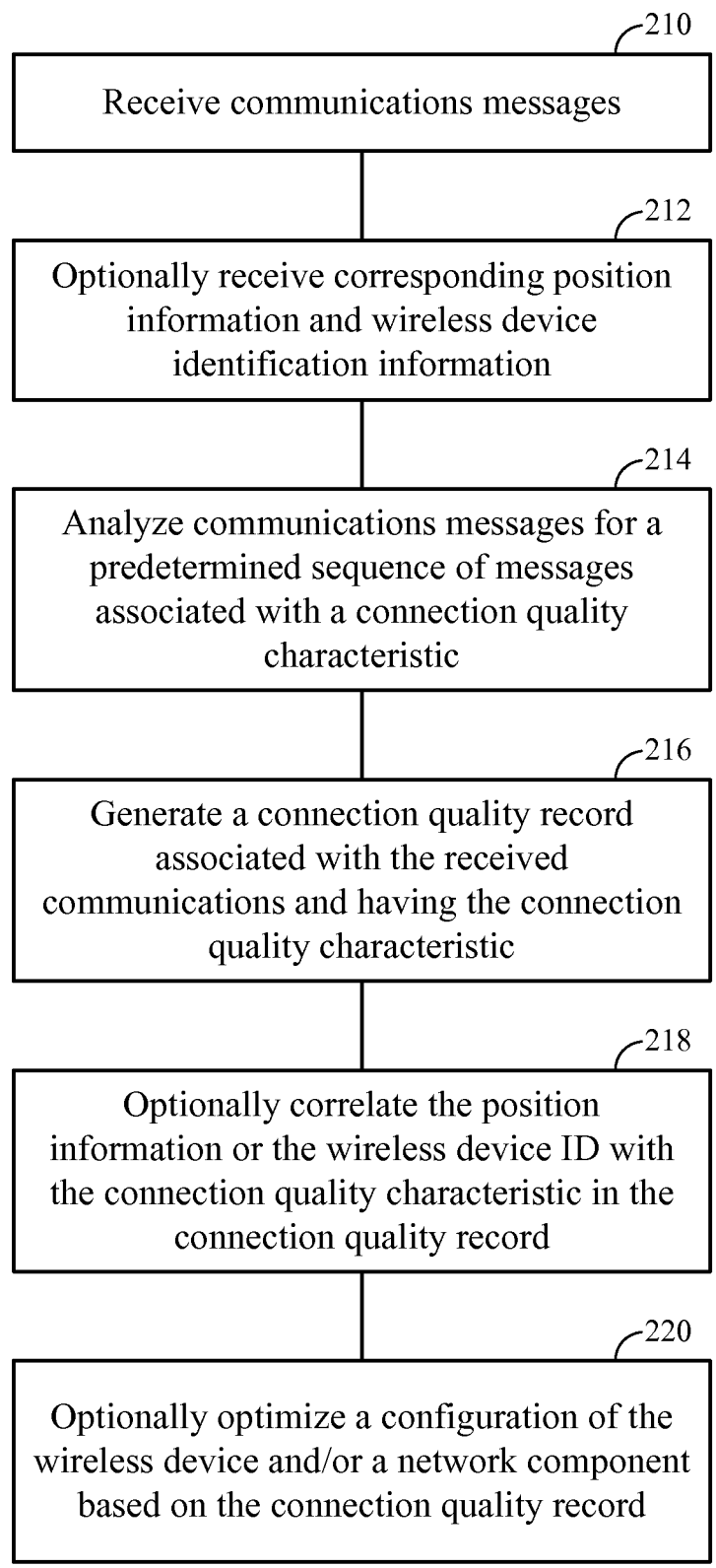
FIG. 32 is a flowchart of one embodiment of a method for determining a connection quality characteristic of a wireless device with a wireless network.

Thus, in summary, referring to FIG. 32, one embodiment of a method of determining a connection quality of a wireless device with a wireless communications network comprises receiving a plurality of communications messages (Block 210). For example, such communications messages include messages 28 in communications log 22 as recorded by and sent from wireless device 12,14,16,17,18 to user manager 24 over wireless network 30. In an optional step, the method may include receiving position information and/or device identification information that is correlated to the received communications messages (Block 212). For example, such position information includes position information 90 and such device identification information includes wireless device ID 88 sent from wireless device 12,14,16,17,18 to user manager 24 over wireless network 30. Next, the method includes analyzing the communications messages for a predetermined sequence of messages associated with a connection quality characteristic (Block 214). For example, this step includes analysis engine 32 executing connection quality module 34 to search for predetermined access failure-related sequences of communications messages 36 and for predetermined call drop-related sequences of communications messages 40 contained within the plurality of communications messages 28. Further, the method includes generating a connection quality record associated with the received communications and having the connection quality characteristic (Block 216). For example, this step includes analysis engine generating connection quality record 44, which includes connection quality characteristic 26, such as access failures and call drops based on the predetermined sequences 36, 40. Optionally, the method further includes correlating the connection quality characteristic with the position information and/or the wireless device identification information (Block 218). For example, this step includes presenting the results in a table, a geographic map, etc. having a given connection quality characteristic 26 associated with device-related information 86, such as device ID 88 and position information 90. Additionally, the method optionally may include optimizing a configuration of a wireless device and/or a network component based on the connection quality record (Block 220). For example, this step includes analysis engine 32 executing optimization module 46 to run predetermined algorithms or programs to optimize the settings of one or more device- and/or network-related configurations to improve the connection quality, such as by reducing access failures and/or call drops. In another example of this step, the method may include a technician or analyst reviewing the results and manually making the configuration adjustments. Additionally, it should be noted that the method may be implemented in different locations within the system, in different devices, and by centralized or decentralized processing mechanisms.

While the various disclosed embodiments have been illustrated and described, it will be clear that the subject matter of this document is not limited to these embodiments only. Numerous modifications, changes, variations, substitutions and equivalents will be apparent to those skilled in the art without departing from the spirit and scope of the disclosed embodiments as described in the claims.

What is claimed is:

1. A method of determining a connection quality between a wireless device and a wireless communications network, comprising:
    receiving a plurality of communications messages as recorded by the wireless device, wherein the plurality of communications messages comprise standard communications messages transmitted from, and received by, the wireless device via the wireless communication network, and each individual standard communications message is not directly associated with connection-quality-related event mechanisms; and
    generating a connection quality record comprising a connection quality characteristic based on a detection of a predetermined sequence of communications messages that define the connection quality characteristic within the plurality of communications messages, wherein the connection quality record is generated against a set of predetermined parameters;
    wherein the plurality of communications messages comprise messages in a Universal Mobile Telephone System ("UMTS") protocol, and the connection quality characteristic comprises a number of access failures determined by a difference between a sum of access successes and a sum of access attempts,
    wherein the sum of access attempts includes:
    a sum of the number of unique connection request messages of a first type comprising one of an originating call, a terminating call, or an emergency call, and
    a sum of the number of unique connection request messages of a second type followed by either a service request signaling of a first type, or a setup non-access stratum (NAS) signaling message; and
    the sum of access successes includes:
    a sum of a number of alert signal messages associated with ones of the first type and the second type of the unique connection request messages, respectively,
    a sum of a number of connect signaling messages associated with ones of the first type and the second type of the unique connection request messages, respectively, without an associated alert signal message, and
    a sum of a number of connect acknowledge signaling messages associated with ones of the first type and the second type of the unique connection request messages, respectively, without the associated alert signaling message or an associated connect signaling message.

2. The method of claim 1, wherein the connection quality characteristic comprises at least one of an access failure and a call drop.

3. The method of claim 1, further comprising receiving position information corresponding to at least one position of the wireless device during the plurality of communications, and associating the position information with the connection quality characteristic in the generated connection quality record.

4. The method of claim 3, wherein the position information relates to at least one of a geographic position of the wireless device and a geographic position of a network component in communication with the wireless device.

5. The method of claim 4, further comprising generating an optimal configuration of at least one of the wireless device and the network component based on the connection quality characteristic.

6. The method of claim 1, wherein the connection quality characteristic comprises an access failure, wherein the access failure is based on a predetermined relationship between an access attempt and an access success.

7. The method of claim 6, wherein the access attempt comprises a unique radio connection request message of a first type having an establishment cause selected from the group consisting of an original conversational call, a terminating conversational call, and an emergency call, or a second type of the unique radio connection request message having the establishment cause comprising a registration and followed by one of a connection request signaling message or a setup signaling message.

8. The method of claim 6, wherein the access success comprises an alerting signaling message associated with one of the first type or the second type of unique radio connection request message, respectively, or a connect signaling message associated with one of the first type or the second type of unique radio connection request message, respectively, or a connect acknowledgement signaling message associated with one of the first type or the second type of unique radio connection request message, respectively.

9. A method of determining a connection quality between a wireless device and a wireless communications network, comprising:
   receiving a plurality of communications messages as recorded by the wireless device, wherein the plurality of communications messages comprise messages transmitted from and received by the wireless device via the wireless communication network; and
   generating a connection quality record comprising a connection quality characteristic based on a detection of a predetermined sequence of communications messages within the plurality of communications messages;
   wherein the plurality of communications messages comprise messages in a Universal Mobile Telephone System ("UMTS") protocol, and the connection quality characteristic comprises an access failure determined according to the following equation:

number of access failures=Σaccess attempts−Σaccess successes where:
   Σ access attempts=
   a sum of the number of unique RRC_Connection_Request Messages of a first type with an ESTABLISHMENT-CAUSE comprising one of an ORIGINATING_CONVERSATIONAL_CALL, a TERMINATING_CONVERSATIONAL_CALL, and an EMERGENCY_CALL;
   plus
   a sum of the number of unique RRC_Connection_Request Messages of a second type with the ESTABLISHMENTCAUSE=REGISTRATION followed by either a CM_SERVICE_REQUEST_NAS_Signaling with SERV_TYPE=1, or a SETUP_NAS_Signaling message; and
   Σ access successes=
   a sum of a number of ALERTING_NAS_Signaling messages associated with ones of the first type and the second type of the unique RRC_Connection_Request messages, respectively;
   plus
   a sum of a number of CONNECT_NAS_Signaling messages associated with ones of the first type and the second type of the unique RRC_Connection_Request messages, respectively, without an associated ALERTING_NAS_Signaling message;
   plus
   a sum of a number of CONNECT_ACK_NAS_Signaling messages associated with ones of the first type and the second type of the unique RRC_Connection_Request messages, respectively, without the associated ALERTING_NAS_Signaling message or an associated CONNECT_NAS_Signaling message.

10. The method of claim 9, wherein the connection quality characteristic comprises a call drop based on at least one of a state change, an abnormal release, and an abnormal disconnect.

11. The method of claim 10, wherein the state change comprises a change from an active state to an idle state, following an access success, without an associated release signaling message or a disconnect signaling message between the state change.

12. The method of claim 11, wherein the access success comprises an alerting signaling message associated with one of a first type or the second type of unique radio connection request messages, respectively, or a connect signaling message associated with one of the first type or the second type of unique radio connection request messages, respectively, or a connect acknowledgement signaling message associated with one of the first type or the second type of unique radio connection request messages, respectively.

13. The method of claim 12, wherein the first type of unique radio connection request message comprises an establishment cause selected from the group consisting of an original conversational call, a terminating conversational call, and an emergency call, and wherein the second type of unique radio connection request messages comprises an establishment cause having a registration and followed by one of a service request signaling message or a setup signaling message.

14. The method of claim 10, wherein the abnormal release comprises a release signaling message having an abnormal cause code and associated with an alerting signaling message corresponding to an access success.

15. The method of claim 10, wherein the abnormal disconnect comprises a disconnect signaling message having an abnormal cause code and associated with the alerting signaling message corresponding to the access success.

16. A method of determining a connection quality between a wireless device and a wireless communications network, comprising:
   receiving a plurality of communications messages as recorded by the wireless device, wherein the plurality of communications messages comprise messages transmitted from and received by the wireless device via the wireless communication network; and
   generating a connection quality record comprising a connection quality characteristic based on a detection of a predetermined sequence of communications messages within the plurality of communications messages;
   wherein the plurality of communications messages comprise messages in a Universal Mobile Telephone System ("UMTS") protocol, and the connection quality characteristic comprises a call drop determined according to the following equation:

number of call drops=Σcall drops due to state changes+Σabnormal releases+Σabnormal disconnects where:

Σ call drops due to state changes= a sum of the number of NAS_MM state changes from CONNECTION_ACTIVE to CONNECTION_IDLE except when there is a RELEASE_NAS_Signaling message or a DISCONNECT_NAS_Signaling message between the state change, and associated with an access success, wherein the access success comprises:

an ALERTING_NAS_Signaling message associated with ones of a first type and a second type of unique RRC_Connection_Request messages, respectively; or a CONNECT_NAS_Signaling message associated with ones of the first type and the second type of unique RRC_Connection_Request messages, respectively, without an associated ALERTING_NAS_Signaling message; or a CONNECT_ACK_NAS_Signaling message associated with ones of the first type and the second type of unique RRC_Connection_Request message, respectively, without the associated ALERTING_NAS_Signaling message or an associated CONNECT_NAS_Signaling message;

wherein the first type of unique RRC_Connection_Request message comprises an ESTABLISHMENT-CAUSE comprising one of an ORIGINATING_CONVERSATIONAL_CALL, a TERMINATING_CONVERSATIONAL_CALL, and an EMERGENCY_CALL;

wherein the second type of unique RRC_Connection_Request Message comprises the ESTABLISHMENTCAUSE=REGISTRATION followed by either a CM_SERVICE_REQUEST_NAS_Signaling with SERV_TYPE=1 or a SETUP_NAS_Signaling message; and without any new RRC_Connection_Request Message in between;

Σ abnormal releases= a sum of the number of RELEASE_NAS_Signaling Messages having a CAUSE≠NORMAL and associated with the ALERTING_NAS_Signaling message corresponding to the access success, and not preceded by an associated DISCONNECT_NAS_Signaling message; and Σ abnormal disconnects= a sum of the number of DISCONNECT_NAS_Signaling having the CAUSE≠NORMAL and associated with the ALERTING_NAS_Signaling message corresponding to the access success, and not preceded by an associated RELEASE_NAS_Signaling message.

17. A method of determining a connection quality between a wireless device and a wireless communications network, comprising:

receiving a plurality of standard communications messages transmitted from and received by the wireless device on the wireless communications network, wherein each individual standard communications message is not directly associated with connection-quality-related event mechanisms;

identifying a connection quality characteristic within the plurality of communications messages based on a detection of a predetermined sequence of messages that define the connection quality characteristic;

generating a connection quality record associated with the received plurality of messages, the connection quality record comprising the connection quality characteristic, wherein the connection quality record is generated against a set of predetermined parameters; and generating a configuration change for at least one of the wireless device and a network component in the wireless communication network based on the connection quality record;

wherein the plurality of communications messages comprise messages in a Universal Mobile Telephone System ("UMTS") protocol, and the connection quality characteristic comprises a number of access failures determined by a difference between a sum of access successes and a sum of access attempts, wherein the sum of access attempts includes:

a sum of the number of unique connection request messages of a first type comprising one of an originating call, a terminating call, or an emergency call, and a sum of the number of unique connection request messages of a second type followed by either a service request signaling of a first type, or a setup non-access stratum (NAS) signaling message; and the sum of access successes includes:

a sum of a number of alert signal messages associated with ones of the first type and the second type of the unique connection request messages, respectively, a sum of a number of connect signaling messages associated with ones of the first type and the second type of the unique connection request messages, respectively, without an associated alert signal message, and a sum of a number of connect acknowledge signaling messages associated with ones of the first type and the second type of the unique connection request messages, respectively, without the associated alert signaling message or an associated connect signaling message.

18. The method of claim 17, further comprising receiving a second plurality of communications messages transmitted from and received by a second wireless device on the wireless communications network; and receiving a first set and a second set of position information respectively corresponding to the plurality of communications and the second plurality of communications, and respectively corresponding to the wireless device and the second wireless device, wherein the generating the connection quality record further comprises correlating the connection quality characteristic with positions from the first set and the second set of position information.

19. A wireless device connection quality determining apparatus, comprising:

a user manager configured to receive a plurality of standard communications messages as recorded by the wireless device, wherein the plurality of communications messages comprise transmitted messages sent from the wireless device over a wireless communications network and each individual standard communications message is not directly associated with connection-quality-related event mechanisms; and a connection quality module configured to generate a connection quality record comprising a connection quality characteristic based on a detection of a predetermined sequence of communications messages that define the connection quality characteristic within the plurality of communications messages, wherein the connection quality record is generated against a set of predetermined parameters;

wherein the plurality of communications messages comprise messages in a Universal Mobile Telephone System ("UMTS") protocol, and the connection quality characteristic comprises a number of access failures determined by a difference between a sum of access successes and a sum of access attempts, wherein the sum of access attempts includes:
a sum of the number of unique connection request messages of a first type comprising one of an originating call, a terminating call, or an emergency call, and
a sum of the number of unique connection request messages of a second type followed by either a service request signaling of a first type, or a setup non-access stratum (NAS) signaling message; and
the sum of access successes includes:
a sum of a number of alert signal messages associated with ones of the first type and the second type of the unique connection request messages, respectively,
a sum of a number of connect signaling messages associated with ones of the first type and the second type of the unique connection request messages, respectively, without an associated alert signal message, and
a sum of a number of connect acknowledge signaling messages associated with ones of the first type and the second type of the unique connection request messages, respectively, without the associated alert signaling message or an associated connect signaling message.

20. The apparatus of claim 19, wherein the connection quality characteristic comprises at least one of an access failure and a call drop.

21. The apparatus of claim 19, wherein the user manager is configured to receive position information corresponding to at least one position of the wireless device during the plurality of communications, and the connection quality module is further configured to associate the position information with the connection quality characteristic in the generated connection quality record.

22. The apparatus of claim 21, wherein the position information comprises at least one of a geographic position of the wireless device and a geographic position of a network component in communication with the wireless device.

23. The apparatus of claim 19, further comprising an optimization module configured to generate an optimal configuration of at least one of the wireless device and a network component of the wireless communications network based on the connection quality characteristic.

24. The apparatus of claim 19, wherein the connection quality characteristic comprises an access failure based on a predetermined relationship between an access attempt and an access success.

25. The apparatus of claim 24, wherein the access attempt comprises a unique radio connection request message of a first type having an establishment cause selected from the group consisting of an original conversational call, a terminating conversational call, and an emergency call, or a second type of the unique radio connection request message having the establishment cause comprising a registration and followed by one of a connection request signaling message or a setup signaling message.

26. The apparatus of claim 25, wherein the access success comprises an alerting signaling message associated with one of the first type or the second type of unique radio connection request message, respectively, or a connect signaling message associated with one of the first type or the second type of unique radio connection request message, respectively, or a connect acknowledgement signaling message associated with one of the first type or the second type of unique radio connection request message, respectively.

27. A wireless device connection quality determining apparatus, comprising:
a user manager configured to receive a plurality of communications messages as recorded by the wireless device, wherein the plurality of communications messages comprise transmitted messages sent from the wireless device over a wireless communications network; and
a connection quality module configured to generate a connection quality record comprising a connection quality characteristic based on a detection of a predetermined sequence of communications messages within the plurality of communications messages;
wherein the plurality of communications messages comprise messages in a Universal Mobile Telephone System ("UMTS") protocol, the connection quality characteristic comprises an access failure, and the connection quality module determines the access failure according to the following equation:

$$\text{number of access failures} = \Sigma \text{access attempts} - \Sigma \text{access successes}$$

where:
Σ access attempts=
a sum of the number of unique RRC_Connection_Request Messages of a first type with an ESTABLISHMENTCAUSE comprising one of an ORIGINATING_CONVERSATIONAL_CALL, a TERMINATING_CONVERSATIONAL_CALL, and an EMERGENCY_CALL;
plus
a sum of the number of unique RRC_Connection_Request Messages of a second type with the ESTABLISHMENTCAUSE=REGISTRATION followed by either a CM_SERVICE_REQUEST_NAS_Signaling with SERV_TYPE=1, or a SETUP_NAS_Signaling message; and
Σ access successes=
a sum of a number of ALERTING_NAS_Signaling messages associated with ones of the first type and the second type of the unique RRC_Connection_Request messages, respectively;
plus
a sum of a number of CONNECT_NAS_Signaling messages associated with ones of the first type and the second type of the unique RRC_Connection_Request messages, respectively, without an associated ALERTING_NAS_Signaling message;
plus
a sum of a number of CONNECT_ACK_NAS_Signaling messages associated with ones of the first type and the second type of the unique RRC_Connection_Request messages, respectively, without the associated ALERTING_NAS_Signaling message or an associated CONNECT_NAS_Signaling message.

28. The apparatus of claim 19, wherein the connection quality characteristic comprises a call drop based on at least one of a state change, an abnormal release and an abnormal disconnect.

29. The apparatus of claim 28, wherein the connection quality module is operable to identify the state change by identifying within the plurality of communications messages a change from an active state to an idle state, following an access success, without an associated release signaling message or a disconnect signaling message therebetween.

30. The apparatus of claim 29, wherein the access success comprises an alerting signaling message associated with one of a first type or the second type of unique radio connection request messages, respectively, or a connect signaling message associated with one of the first type or the second type of unique radio connection request messages, respectively, or a connect acknowledgement signaling message associated with one of the first type or the second type of unique radio connection request messages, respectively.

31. The apparatus of claim 30, wherein the first type of unique radio connection request message comprises an establishment cause selected from the group consisting of an original conversational call, a terminating conversational call, and an emergency call, and the second type of unique radio connection request messages comprises an establishment cause having a registration and followed by one of a service request signaling message and a setup signaling message.

32. The apparatus of claim 28, wherein the abnormal release comprises a release signaling message having an abnormal cause code and associated with an alerting signaling message corresponding to an access success.

33. The apparatus of claim 28, wherein the abnormal disconnect comprises a disconnect signaling message having an abnormal cause code and associated with the alerting signaling message corresponding to the access success.

34. A wireless device connection quality determination apparatus, comprising:
   a user manager configured to receive a plurality of communications messages as recorded by the wireless device, wherein the plurality of communications messages comprise transmitted messages sent from the wireless device over a wireless communications network; and
   a connection quality module configured to generate a connection quality record comprising a connection quality characteristic based on a detection of a predetermined sequence of communications messages within the plurality of communications messages;
   wherein the plurality of communications messages comprise messages in a Universal Mobile Telephone System ("UMTS") protocol, the connection quality characteristic comprises a call drop, and the connection quality module is operable to determine the call drop according to the following equation:

number of call drops=Σcall drops due to state changes+Σabnormal releases+Σabnormal disconnects where:
   Σ call drops due to state changes=
      a sum of the number of NAS_MM state changes from CONNECTION_ACTIVE to CONNECTION_IDLE except when there is a RELEASE_NAS_Signaling message or a DISCONNECT_NAS_Signaling message between the state change, and associated with an access success, wherein the access success comprises:
         an ALERTING_NAS_Signaling message associated with ones of a first type and a second type of unique RRC_Connection_Request messages, respectively;
         or
         a CONNECT_NAS_Signaling message associated with ones of the first type and the second type of unique RRC_Connection_Request messages, respectively, without an associated ALERTING_NAS_Signaling message;
         or
         a CONNECT_ACK_NAS_Signaling message associated with ones of the first type and the second type of unique RRC_Connection_Request message, respectively, without the associated ALERTING_NAS_Signaling message or an associated CONNECT_NAS_Signaling message;
   wherein the first type of unique RRC_Connection_Request message comprises an ESTABLISHMENTCAUSE comprising one of an ORIGINATING_CONVERSATIONAL_CALL, a TERMINATING_CONVERSATIONAL_CALL, and an EMERGENCY_CALL;
   wherein the second type of unique RRC_Connection_Request Message comprises the ESTABLISHMENTCAUSE=REGISTRATION followed by either a CM_SERVICE_REQUEST_NAS_Signaling with SERV_TYPE=1 or a SETUP_NAS_Signaling message; and without any new RRC_Connection_Request Message in between;
   Σ abnormal releases=
      a sum of the number of RELEASE_NAS_Signaling Messages having a CAUSE≠NORMAL and associated with the ALERTING_NAS_Signaling message corresponding to the access success, and not preceded by an associated DISCONNECT_NAS_Signaling message; and
   Σ abnormal disconnects=
      a sum of the number of DISCONNECT_NAS_Signaling having the CAUSE≠NORMAL and associated with the ALERTING_NAS_Signaling message corresponding to the access success, and not preceded by an associated RELEASE_NAS_Signaling message.

35. An apparatus for determining a connection quality between a wireless device and a wireless communications network, comprising:
   a first means for receiving a plurality of standard communications messages transmitted from and received by the wireless device on the wireless communications network, wherein each individual standard communications message is not directly associated with connection-quality-related event mechanisms;
   a second means for identifying a connection quality characteristic within the plurality of communications messages based on a detection of a predetermined sequence of messages that define the connection quality characteristic;
   a third means for generating a connection quality record associated with the received plurality of messages, wherein the connection quality record comprises the connection quality characteristic, and the connection quality record is generated against a set of predetermined parameters; and
   a fourth means for generating a configuration change for at least one of the wireless device and a network component in the wireless communication network based on the connection quality record;
   wherein the plurality of communications messages comprise messages in a Universal Mobile Telephone System ("UMTS") protocol, and the connection quality characteristic comprises a number of call drops determined by adding a sum of a number of call drops due to state changes, a sum of abnormal releases, and a sum of abnormal disconnects,
   wherein the sum of a number of call drops due to state changes includes:
   a sum of the number of state changes from active to idle, except when there is a release message or a disconnect message between the state change, and associated with an access success, wherein the access success comprises:
   an alert message associated with ones of a first type and a second type of unique connection request messages, respectively, a connect message associated with ones of the first type and the second type of unique connection request messages, respectively, without an associated alerting message, or a connect signaling message associated with ones of the first type and the second type of unique connection request message, respectively, without the associated alerting message or an associated connect message;

wherein the first type of unique connection request message comprises one of an one of an originating call, a terminating call, or an emergency call; and wherein the second type of unique connection request message comprises a service request signaling of a first type, or a setup non-access stratum (NAS) signaling message;

wherein the sum of abnormal releases includes:

a sum of the number of release messages having an abnormal cause and associated with the alerting message corresponding to the access success, and not preceded by an associated disconnect message; and wherein the sum of abnormal disconnects includes:

a sum of the number of disconnect messages having an abnormal cause and associated with the alerting message corresponding to the access success, and not preceded by an associated release message.

36. A non-transitory computer-readable medium for determining a connection quality between a wireless device and a wireless communications network, comprising:

at least one sequence of instructions, wherein execution of the instructions by a processor causes the processor to perform:

receiving a plurality of communications messages as recorded by the wireless device, wherein the plurality of communications messages comprise standard communications messages transmitted from, and received by, the wireless device via the wireless communication network, and each individual standard communications message is not directly associated with connection-quality-related event mechanisms; and generating a connection quality record comprising a connection quality characteristic based on a detection of a predetermined sequence of communications messages that define the connection quality characteristic within the plurality of communications messages, wherein the connection quality record is generated against a set of predetermined parameters;

wherein the plurality of communications messages comprise messages in a Universal Mobile Telephone System ("UMTS") protocol, and the connection quality characteristic comprises a number of access failures determined by a difference between a sum of access successes and a sum of access attempts, wherein the sum of access attempts includes:

a sum of the number of unique connection request messages of a first type comprising one of an originating call, a terminating call, or an emergency call, and a sum of the number of unique connection request messages of a second type followed by either a service request signaling of a first type, or a setup non-access stratum (NAS) signaling message; and the sum of access successes includes:

a sum of a number of alert signal messages associated with ones of the first type and the second type of the unique connection request messages, respectively, a sum of a number of connect signaling messages associated with ones of the first type and the second type of the unique connection request messages, respectively, without an associated alert signal message, and a sum of a number of connect acknowledge signaling messages associated with ones of the first type and the second type of the unique connection request messages, respectively, without the associated alert signaling message or an associated connect signaling message.

37. A non-transitory computer-readable medium for determining a connection quality between a wireless device and a wireless communications network, comprising:

at least one sequence of instructions, wherein execution of the at least one sequence instructions by a processor causes the processor to perform:

receiving a plurality of communications messages as recorded by the wireless device, wherein the plurality of communications messages comprise messages transmitted from and received by the wireless device via the wireless communication network; and generating a connection quality record comprising a connection quality characteristic based on a detection of a predetermined sequence of communications messages within the plurality of communications messages;

wherein the plurality of communications messages comprise messages in a Universal Mobile Telephone System ("UMTS") protocol, and the connection quality characteristic comprises a number of call drops determined by adding a sum of a number of call drops due to state changes, a sum of abnormal releases, and a sum of abnormal disconnects, wherein the sum of a number of call drops due to state changes includes:

a sum of the number of state changes from active to idle, except when there is a release message or a disconnect message between the state change, and associated with an access success, wherein the access success comprises:

an alert message associated with ones of a first type and a second type of unique connection request messages, respectively, a connect message associated with ones of the first type and the second type of unique connection request messages, respectively, without an associated alerting message, or a connect signaling message associated with ones of the first type and the second type of unique connection request message, respectively, without the associated alerting message or an associated connect message;

wherein the first type of unique connection request message comprises one of an one of an originating call, a terminating call, or an emergency call; and wherein the second type of unique connection request message comprises a service request signaling of a first type, or a setup non-access stratum (NAS) signaling message;

wherein the sum of abnormal releases includes:

a sum of the number of release messages having an abnormal cause and associated with the alerting message corresponding to the access success, and not preceded by an associated disconnect message; and wherein the sum of abnormal disconnects includes:

a sum of the number of disconnect messages having an abnormal cause and associated with the alerting message corresponding to the access success, and not preceded by an associated release message.

38. A non-transitory computer-readable medium for determining a connection quality between a wireless device and a wireless communications network, comprising:

at least one sequence of instructions, wherein execution of the at least one sequence instructions by a processor causes the processor to perform:

receiving a plurality of standard communications messages transmitted from and received by the wireless device on the wireless communications network, wherein each individual standard communications message is not directly associated with connection-quality-related event mechanisms;

identifying a connection quality characteristic within the plurality of communications messages based on a detection of a predetermined sequence of messages that define the connection quality characteristic;

generating a connection quality record associated with the received plurality of messages, wherein the connection quality record comprises the connection quality characteristic, wherein the connection quality record is generated against a set of predetermined parameters; and generating a configuration change for at least one of the wireless device and a network component in the wireless communication network based on the connection quality record;

wherein the plurality of communications messages comprise messages in a Universal Mobile Telephone System ("UMTS") protocol, and the connection quality characteristic comprises a number of access failures determined by a difference between a sum of access successes and a sum of access attempts, wherein the sum of access attempts includes:

a sum of the number of unique connection request messages of a first type comprising one of an originating call, a terminating call, or an emergency call, and a sum of the number of unique connection request messages of a second type followed by either a service request signaling of a first type, or a setup non-access stratum (NAS) signaling message; and the sum of access successes includes:

a sum of a number of alert signal messages associated with ones of the first type and the second type of the unique connection request messages, respectively, a sum of a number of connect signaling messages associated with ones of the first type and the second type of the unique connection request messages, respectively, without an associated alert signal message, and a sum of a number of connect acknowledge signaling messages associated with ones of the first type and the second type of the unique connection request messages, respectively, without the associated alert signaling message or an associated connect signaling message.

39. A wireless communications device, comprising:

a processor configured to transmit and receive a plurality of standard communications messages respectively to and from a wireless network, wherein each individual standard communications message is not directly associated with connection quality-related event mechanisms; and a memory configured to have a resident connection quality module comprising executable instructions operable to collect and forward the communications messages across the wireless network, wherein a predetermined sequence of the plurality of communications messages defines a connection quality characteristic of the wireless device on the wireless network, and the connection quality metric is generated against a set of predetermined parameters;

wherein the plurality of communications messages comprise messages in a Universal Mobile Telephone System ("UMTS") protocol, and the connection quality characteristic comprises a number of access failures determined by a difference between a sum of access successes and a sum of access attempts, wherein the sum of access attempts includes:

a sum of the number of unique connection request messages of a first type comprising one of an originating call, a terminating call, or an emergency call, and a sum of the number of unique connection request messages of a second type followed by either a service request signaling of a first type, or a setup non-access stratum (NAS) signaling message; and the sum of access successes includes:

a sum of a number of alert signal messages associated with ones of the first type and the second type of the unique connection request messages, respectively, a sum of a number of connect signaling messages associated with ones of the first type and the second type of the unique connection request messages, respectively, without an associated alert signal message, and a sum of a number of connect acknowledge signaling messages associated with ones of the first type and the second type of the unique connection request messages, respectively, without the associated alert signaling message or an associated connect signaling message.

40. A wireless communications device, comprising:

a processor including at least one sequence of instructions, wherein execution of the instructions by the processor causes the processor to perform:

processing a plurality of standard communications messages for transmission from the wireless communications device to a wireless communications network, and for receipt by the wireless communications device from the wireless communications network, wherein each individual standard communications message is not directly associated with connection-quality-related event mechanisms; and gathering the plurality of communications messages in the form of a communications log and transmitting, at a predetermined time, the communications log across the wireless communications network, wherein a predetermined sequence of the plurality of communications messages defines a connection quality characteristic of the wireless device on the wireless network, and the connection quality characteristic is generated against a set of predetermined parameters;

wherein the plurality of communications messages comprise messages in a Universal Mobile Telephone System ("UMTS") protocol, and the connection quality characteristic comprises a number of call drops determined by adding a sum of a number of call drops due to state changes, a sum of abnormal releases, and a sum of abnormal disconnects, wherein the sum of a number of call drops due to state changes includes:

a sum of the number of state changes from active to idle, except when there is a release message or a disconnect message between the state change, and associated with an access success, wherein the access success comprises:

an alert message associated with ones of a first type and a second type of unique connection request messages, respectively, a connect message associated with ones of the first type and the second type of unique connection request messages, respectively, without an associated alerting message, or a connect signaling message associated with ones of the first type and the second type of unique connection request message, respectively, without the associated alerting message or an associated connect message;

wherein the first type of unique connection request message comprises one of an one of an originating call, a terminating call, or an emergency call; and
wherein the second type of unique connection request message comprises a service request signaling of a first type, or a setup non-access stratum (NAS) signaling message;
wherein the sum of abnormal releases includes:
a sum of the number of release messages having an abnormal cause and associated with the alerting message corresponding to the access success, and not preceded by an associated disconnect message; and
wherein the sum of abnormal disconnects includes:
a sum of the number of disconnect messages having an abnormal cause and associated with the alerting message corresponding to the access success, and not preceded by an associated release message.

41. A wireless communications device, comprising:
a first means for processing a plurality of standard communications messages for transmission from the wireless communications device to a wireless communications network and for receipt by the wireless communications device from the wireless communications network, wherein each individual standard communications message is not directly associated with connection-quality-related event mechanisms; and
a second means for gathering the plurality of communications messages in the form of a communications log and transmitting, at a predetermined time, the communications log across the wireless communications network;
wherein a predetermined sequence of the plurality of communications messages defines a connection quality characteristic of the wireless device on the wireless network, and the connection quality characteristic is generated against a set of predetermined parameters;
wherein the plurality of communications messages comprise messages in a Universal Mobile Telephone System ("UMTS") protocol, and the connection quality characteristic comprises a number of call drops determined by adding a sum of a number of call drops due to state changes, a sum of abnormal releases, and a sum of abnormal disconnects,
wherein the sum of a number of call drops due to state changes includes:
a sum of the number of state changes from active to idle, except when there is a release message or a disconnect message between the state change, and associated with an access success, wherein the access success comprises:
an alert message associated with ones of a first type and a second type of unique connection request messages, respectively,
a connect message associated with ones of the first type and the second type of unique connection request messages, respectively, without an associated alerting message, or
a connect signaling message associated with ones of the first type and the second type of unique connection request message, respectively, without the associated alerting message or an associated connect message;
wherein the first type of unique connection request message comprises one of an one of an originating call, a terminating call, or an emergency call; and
wherein the second type of unique connection request message comprises a service request signaling of a first type, or a setup non-access stratum (NAS) signaling message;
wherein the sum of abnormal releases includes:
a sum of the number of release messages having an abnormal cause and associated with the alerting message corresponding to the access success, and not preceded by an associated disconnect message; and
wherein the sum of abnormal disconnects includes:
a sum of the number of disconnect messages having an abnormal cause and associated with the alerting message corresponding to the access success, and not preceded by an associated release message.

42. A method for determining a connection quality characteristic of a wireless communications device, comprising:
processing a plurality of standard communications messages for transmission from the wireless communications device to a wireless communications network and for receipt by the wireless communications device from the wireless communications network, wherein each individual standard communications message is not directly associated with connection-quality related event mechanisms;
gathering the plurality of communications messages in the form of a communications log; and
transmitting, at a predetermined time, the communications log across the wireless communications network;
wherein a predetermined sequence of the plurality of communications messages defines a connection quality characteristic of the wireless device on the wireless network, and the connection quality characteristic is generated against a set of predetermined parameters;
wherein the plurality of communications messages comprise messages in a Universal Mobile Telephone System ("UMTS") protocol, and the connection quality characteristic comprises a number of call drops determined by adding a sum of a number of call drops due to state changes, a sum of abnormal releases, and a sum of abnormal disconnects,
wherein the sum of a number of call drops due to state changes includes:
a sum of the number of state changes from active to idle, except when there is a release message or a disconnect message between the state change, and associated with an access success, wherein the access success comprises:
an alert message associated with ones of a first type and a second type of unique connection request messages, respectively,
a connect message associated with ones of the first type and the second type of unique connection request messages, respectively, without an associated alerting message, or
a connect signaling message associated with ones of the first type and the second type of unique connection request message, respectively, without the associated alerting message or an associated connect message;
wherein the first type of unique connection request message comprises one of an one of an originating call, a terminating call, or an emergency call; and
wherein the second type of unique connection request message comprises a service request signaling of a first type, or a setup non-access stratum (NAS) signaling message;
wherein the sum of abnormal releases includes:
a sum of the number of release messages having an abnormal cause and associated with the alerting message corresponding to the access success, and not preceded by an associated disconnect message; and
wherein the sum of abnormal disconnects includes:
a sum of the number of disconnect messages having an abnormal cause and associated with the alerting message corresponding to the access success, and not preceded by an associated release message.

43. A non-transitory computer-readable medium for determining a connection quality between a wireless device and a wireless communications network, comprising:
  at least one sequence of instructions, wherein execution of the instructions by a processor causes the processor to perform:
  processing a plurality of standard communications messages for transmission from the wireless communications device to a wireless communications network and for receipt by the wireless communications device from the wireless communications network, wherein each individual standard communications message is not directly associated with connection-quality related event mechanisms;
  gathering the plurality of communications messages in the form of a communications log; and
  transmitting, at a predetermined time, the communications log across the wireless communications network,
  wherein a predetermined sequence of the plurality of communications messages defines a connection quality characteristic of the wireless device on the wireless network, and the connection quality characteristic is generated against a set of predetermined parameters;
  wherein the plurality of communications messages comprise messages in a Universal Mobile Telephone System ("UMTS") protocol, and the connection quality characteristic comprises a number of call drops determined by adding a sum of a number of call drops due to state changes, a sum of abnormal releases, and a sum of abnormal disconnects,
  wherein the sum of a number of call drops due to state changes includes:
  a sum of the number of state changes from active to idle, except when there is a release message or a disconnect message between the state change, and associated with an access success, wherein the access success comprises:
  an alert message associated with ones of a first type and a second type of unique connection request messages, respectively,
  a connect message associated with ones of the first type and the second type of unique connection request messages, respectively, without an associated alerting message, or
  a connect signaling message associated with ones of the first type and the second type of unique connection request message, respectively, without the associated alerting message or an associated connect message;
  wherein the first type of unique connection request message comprises one of an one of an originating call, a terminating call, or an emergency call; and
  wherein the second type of unique connection request message comprises a service request signaling of a first type, or a setup non-access stratum (NAS) signaling message;
  wherein the sum of abnormal releases includes:
  a sum of the number of release messages having an abnormal cause and associated with the alerting message corresponding to the access success, and not preceded by an associated disconnect message; and
  wherein the sum of abnormal disconnects includes:
  a sum of the number of disconnect messages having an abnormal cause and associated with the alerting message corresponding to the access success, and not preceded by an associated release message.

44. The method of claim 6, wherein the access attempt is defined as a unique radio connection request message of a first type having an establishment cause selected from the group consisting of an original conversational call, a terminating conversational call, and an emergency call; and the access attempt is also defined as a second type of the unique radio connection request message having the establishment cause comprising a registration and followed by one of a connection request signaling message or a setup signaling message.

45. The method of claim 44, wherein the access success is defined as an alerting signaling message associated with one of the first type or the second type of unique radio connection request message, respectively; the access success is also defined as a connect signaling message associated with one of the first type or the second type of unique radio connection request message, respectively; and the access success is also defined as a connect acknowledgement signaling message associated with one of the first type or the second type of unique radio connection request message, respectively.

46. The method of claim 6, wherein the access success is defined as an alerting signaling message associated with one of the first type or the second type of unique radio connection request message, respectively; the access success is also defined as a connect signaling message associated with one of the first type or the second type of unique radio connection request message, respectively; and the access success is also defined as a connect acknowledgement signaling message associated with one of the first type or the second type of unique radio connection request message, respectively.

47. The method of claim 11, wherein the access success is defined as an alerting signaling message associated with one of a first type or the second type of unique radio connection request messages, respectively; the access success is also defined as a connect signaling message associated with one of the first type or the second type of unique radio connection request messages, respectively; and the access success is also defined as a connect acknowledgement signaling message associated with one of the first type or the second type of unique radio connection request messages, respectively.

48. The method of claim 47, wherein the first type of unique radio connection request message comprises an establishment cause selected from the group consisting of an original conversational call, a terminating conversational call, and an emergency call; and the second type of unique radio connection request message comprises an establishment cause having a registration and followed by one of a service request signaling message or a setup signaling message.

49. The apparatus of claim 24, wherein the access attempt is defined as a unique radio connection request message of a first type having an establishment cause selected from the group consisting of an original conversational call, a terminating conversational call, and an emergency call; and the access attempt is also defined as a second type of the unique radio connection request message having the establishment cause comprising a registration and followed by one of a connection request signaling message or a setup signaling message.

50. The apparatus of claim 49, wherein the access success is defined as an alerting signaling message associated with one of the first type or the second type of unique radio connection request message, respectively; the access success is also defined as a connect signaling message associated with one of the first type or the second type of unique radio connection request message, respectively; and the access success is also defined as a connect acknowledgement signaling message associated with one of the first type or the second type of unique radio connection request message, respectively.

51. The apparatus of claim 24, wherein the access success is defined as an alerting signaling message associated with one of the first type or the second type of unique radio connection request message, respectively; the access success is also defined as a connect signaling message associated with one of the first type or the second type of unique radio connection request message, respectively; and the access success is also defined as a connect acknowledgement signaling message associated with one of the first type or the second type of unique radio connection request message, respectively.

52. The apparatus of claim 29, wherein the access success is defined as an alerting signaling message associated with one of a first type or the second type of unique radio connection request messages, respectively; the access success is also defined as a connect signaling message associated with one of the first type or the second type of unique radio connection request messages, respectively; and the access success is also defined as a connect acknowledgement signaling message associated with one of the first type or the second type of unique radio connection request messages, respectively.

53. The apparatus of claim 52, wherein the first type of unique radio connection request message comprises an establishment cause selected from the group consisting of an original conversational call, a terminating conversational call, and an emergency call; and the second type of unique radio connection request messages comprises an establishment cause having a registration and followed by one of a service request signaling message or a setup signaling message.

54. The method of claim 1, wherein the connection quality characteristic includes an access failure metric.

55. The method of claim 54, wherein the access failure metric includes a rate of access failure events.

56. The method of claim 54, wherein the access failure metric includes a sum of access failure events.

57. The apparatus of claim 19, wherein the connection quality characteristic includes an access failure metric and the connection quality module is further operable to generate the connection quality record based on the access failure metric.

58. The apparatus of claim 57, wherein the access failure metric includes a rate of access failure events.

59. The apparatus of claim 57, wherein the access failure metric includes a sum of access failure events.

60. The method of claim 42, wherein the communications log comprises position information corresponding to at least one position of the wireless device during the plurality of communications, and the method further comprises associating the position information with the connection quality characteristic.

61. The method of claim 60, wherein the position information relates to at least one of a geographic position of the wireless device or a geographic position of a network component in communication with the wireless device.

62. The method of claim 1, further comprising generating an interactive report including a table presenting specific information relating to the wireless device and the connection quality characteristic.

63. The method of claim 1, further comprising analyzing the connection quality record, wireless device performance data, and wireless device configuration data to determine updated wireless device configurations to improve the connection quality characteristic.

64. The method of claim 1, further comprising analyzing the connection quality record, network performance data, and network configuration data to determine updated network configurations to improve the connection quality characteristic.

* * * * *